US008724961B2

(12) United States Patent
Maeda

(10) Patent No.: US 8,724,961 B2
(45) Date of Patent: May 13, 2014

(54) TERMINAL DEVICE, METHOD FOR CONTROLLING TERMINAL DEVICE, AND RECORDING MEDIUM

(75) Inventor: Kazuhiko Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 796 days.

(21) Appl. No.: 12/759,870

(22) Filed: Apr. 14, 2010

(65) Prior Publication Data

US 2010/0260480 A1 Oct. 14, 2010

(30) Foreign Application Priority Data

Apr. 14, 2009 (JP) .................................. 2009-097760

(51) Int. Cl.
*H04N 9/80* (2006.01)
(52) U.S. Cl.
USPC ............ 386/239; 386/296; 386/353; 386/360
(58) Field of Classification Search
USPC ............... 386/248, 296, 353, E5.003, E5.064
See application file for complete search history.

(56) References Cited

U.S. PATENT DOCUMENTS

| 2005/0283803 | A1 | 12/2005 | Kimura et al. | |
|---|---|---|---|---|
| 2007/0146820 | A1* | 6/2007 | Asazu et al. | 358/479 |
| 2007/0288964 | A1* | 12/2007 | Horiguchi | 725/46 |
| 2008/0256017 | A1* | 10/2008 | Murakami | 706/52 |
| 2010/0005492 | A1* | 1/2010 | Takano et al. | 725/46 |

FOREIGN PATENT DOCUMENTS

| JP | 2000-115098 | 4/2000 |
|---|---|---|
| JP | 2006-5514 | 1/2006 |
| JP | 2007-124465 | 5/2007 |
| JP | 2009-064327 | 3/2009 |
| JP | 2009-65597 | 3/2009 |
| JP | 4270037 | 3/2009 |

* cited by examiner

*Primary Examiner* — Thai Tran
*Assistant Examiner* — Girumsew Wendmagegn
(74) *Attorney, Agent, or Firm* — Wenderoth, Lind & Ponack, L.L.P.

(57) ABSTRACT

A terminal device, upon each receiving of an operation regarding a viewing of a content from a user, stores history information indicating the history thereof. Then upon receiving an instruction for writing a content onto an external recording medium, the terminal device creates preference information based on the history information having been collected therein. The terminal device then writes the content specified by the writing instruction and the created preference information onto the external recording medium.

13 Claims, 25 Drawing Sheets

Preference info stored in optical disc 170
(past preference info)

| Keyword | Evaluation value |
|---------|------------------|
| xxxx    | 0.6              |
| yyyy    | 0.33             |
| efghi   | 0.3              |
| opqrs   | 0.2              |
| ...     | ...              |

Current preference info

| Keyword | Evaluation value |
|---------|------------------|
| sssss   | 0.8              |
| opqrs   | 0.64             |
| yyyy    | 0.3              |
| ddddd   | 0.25             |
| ...     | ...              |

Difference between two preference info

| Keyword | Evaluation value |
|---------|------------------|
| xxxx    | 0.6              |
| efghi   | 0.3              |
| hhhhh   | 0.19             |
| yyyy    | 0.03             |
| ...     | ...              |

FIG. 16A
Content management information

| Title | Explanation |
|---|---|
| bcdef | Produced by pppp and xxxx··· |
| rrrrr | Director bbb··· |
| zzzzz | Wizard starring yyyy··· |
| jklmn | Produced by efghi··· |

FIG. 16B
Recommendation preference information
(only keywords and evaluation values)

| Keyword | Evaluation value |
|---|---|
| xxxx | 0.6 |
| yyyy | 0.33 |
| efghi | 0.3 |
| opqrs | 0.2 |
| ··· | ··· |

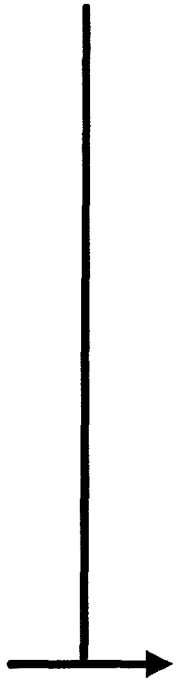

FIG. 16C
Recommendation list

| Title | Explanation | Evaluation value |
|---|---|---|
| bcdef | Produced by pppp and xxxx··· | 1.4 |
| jklmn | Produced by efghi··· | 0.8 |
| zzzzz | Wizard starring yyyy··· | 0.72 |

FIG. 17

Following are recommendations based on history as of "2009/2/8 10:00" when "STUVW" was written.

| Recommendation rank | Title | |
|---|---|---|
| 1 | bcdef | Detail 151a |
| 2 | jklmn | Detail 151b |
| 3 | zzzzz | Detail 151c |

Following are recommendations based on difference between history as of "2009/2/8 10:00" when "STUVW" was written and the current history.

[Detail]

xxxx

You seem to have been watching less cartoons recently.

150

TERMINAL DEVICE, METHOD FOR CONTROLLING TERMINAL DEVICE, AND RECORDING MEDIUM

The disclosure of Japanese Patent Application No. 2009-097760 filed Apr. 14, 2009 including specification, drawings and claims is incorporated herein by reference in its entirety.

TECHNICAL FIELD

The present invention relates to a technology for recommending the user contents based on the preference of the user.

BACKGROUND ART

In recent years, terminal devices that can recommend users contents such as broadcast programs based on the preference of the users have been studied variously.

For example, according to the abstract of Patent Literature 1, states of channel selections by the user are stored in correspondence with broadcast programs, and information related to the programs corresponding to the states of channel selections is extracted and displayed, to support the selection of channel by the user.

CITATION LIST

Patent Literature

Patent Literature 1
Japanese Patent Application Publication No. 2000-115098

SUMMARY OF INVENTION

Technical Problem

The conventional technology described above basically selects contents reflecting the current state of channel selection by the user, and displays the selected contents as recommendations for the user.

However, one problem in the conventional technology is that it cannot recommend the user contents based on the preference of the user at the time other than the present time (for example, the preference of the user in a certain period in the past).

The present invention has been achieved in view of the above problems, and an aim thereof is to provide a terminal device, a method for controlling the terminal device, a recording medium and the like that contribute to recommendation of contents based on the preference of the user at the time except for the present time.

Solution to Problem

One aspect of the present invention for solving the above-mentioned problem is a terminal device comprising: a content storage unit storing one or more contents; an operation receiving unit operable to receive operation regarding viewing of contents from a user; a storage unit collecting history information indicating history of operations in correspondence with each of the contents stored in the content storage unit; a recording medium loading unit in which an external recording medium is loaded in a loadable/unloadable state; a writing receiving unit operable to receive a writing instruction for writing a content stored in the content storage unit to the external recording medium; a generating unit operable to, upon reception of the writing instruction, generate preference information of the user in accordance with a piece of history information corresponding to the content specified in the writing instruction; and a writing unit operable to write the specified content and the corresponding preference information onto the external recording medium.

Advantageous Effects of Invention

With the above-described aspect of the present invention, it is possible to prepare contents as recommendations for the user based on the preference information written on the external recording medium. In particular, when the user is to read the preference information after a long time has passed since the writing of the preference information onto the external recording medium, it is possible to recommend the user the contents that reflect the preference of the user at the time of writing the preference information in the past.

As described above, the present invention can contribute to recommendation of contents that is based on the preference of the user at the time other than the present time.

BRIEF DESCRIPTION OF DRAWINGS

The present invention will be described with reference to the drawings, in which:

FIGS. 16A through 16C show how evaluation values of the contents are calculated;
FIG. 17 shows an example of the displayed recommendation list;
FIG. 21 shows an example of display of the recommendation list;

DESCRIPTION OF EMBODIMENTS

Embodiments

Embodiments of the present invention are described below with reference to the drawings.

First Embodiment

The following describes a terminal device consistent with the first embodiment of the present invention with reference to the attached drawings.

<Structure>

Figure 1:
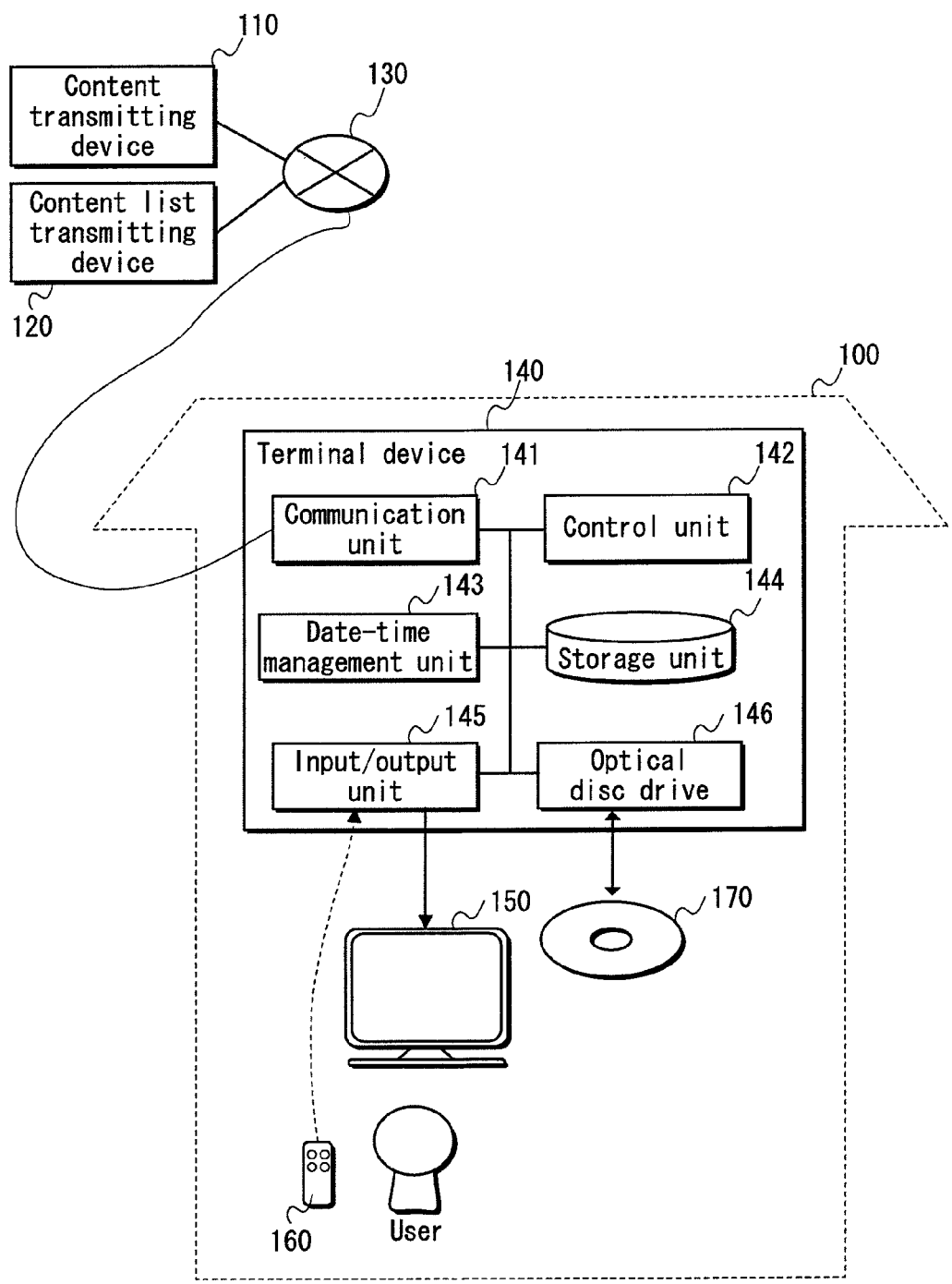
FIG. 1 illustrates the structure of the system.

FIG. 1 illustrates the structure of a system including the terminal device.

As shown in FIG. 1, a system 1 includes a user's house 100, a content transmitting device 110, a content list transmitting device 120, and a house-external transmission path 130, wherein the user's house 100, content transmitting device 110, and content list transmitting device 120 are connected with each other via the house-external transmission path 130.

The house-external transmission path 130 is, for example, a wired network such as Ethernet™, a wireless network such as a wireless LAN, a network by broadcast waves, the Internet, or a network composed of any combination of these networks.

The content transmitting device 110 transmits contents to a terminal device 140 provided in the user's house 100 via the house-external transmission path 130.

The content transmitting device 110 is composed of, for example, a content server in a Video-On-Demand (VOD) service, or a broadcast program transmitting device in the ground-based broadcasting.

The content list transmitting device 120 transmits a content list to the terminal device 140 via the house-external transmission path 130.

The content list includes information explaining contents that includes contents scheduled to be transmitted by the content transmitting device 110, and contents that can be transmitted currently. Looking through the content list displayed on a display device 150, the user can grasp the outline of each content held by the content transmitting device 110.

The content list is composed of an Electronic Program Guide (EPG) in the case of the ground-based broadcasting.

The terminal device 140, the display device 150, an input device 160, and an optical disc 170 are provided in the user's house 100.

The terminal device 140 is composed of, for example, a digital video recorder (recording/playback device), and has functions that are supported by a general digital video recorder: a function to record a content received from the content transmitting device 110; a function to playback the recorded content; and a function to write (copy) the recorded content onto the optical disc 170.

The display device 150 is composed of, for example, a general digital television such as a 32V-type plasma display.

The terminal device 140 and the display device 150 are connected with each other by, for example, a High-Definition Multimedia Interface (HDMI) digital cable. The display device 150 receives video and audio from the terminal device 140 via the digital cable and outputs the received video and audio.

The input device 160 is composed of, for example, an infrared remote control, and transmits a signal representing a user's operation to the terminal device 140. Note that the input device 160 may be an operation unit equipped in the terminal device 140, not the remote control.

The optical disc 170 is composed of, for example, a Blu-ray Disc (BD).

Next, the structure of the terminal device 140 will be described.

The terminal device 140 includes a communication unit 141, a control unit 142, a date-time management unit 143, a storage unit 144, an input/output unit 145, and an optical disc drive 146.

The communication unit 141 has a function to transmit and receive data via the house-external transmission path 130. The communication unit 141 receives contents from the content transmitting device 110, and the content list from the content list transmitting device 120.

The communication unit 141 is composed of, for example, a Network Interface Card (NIC) or a receiving antenna for digital broadcasting.

Figure 2:
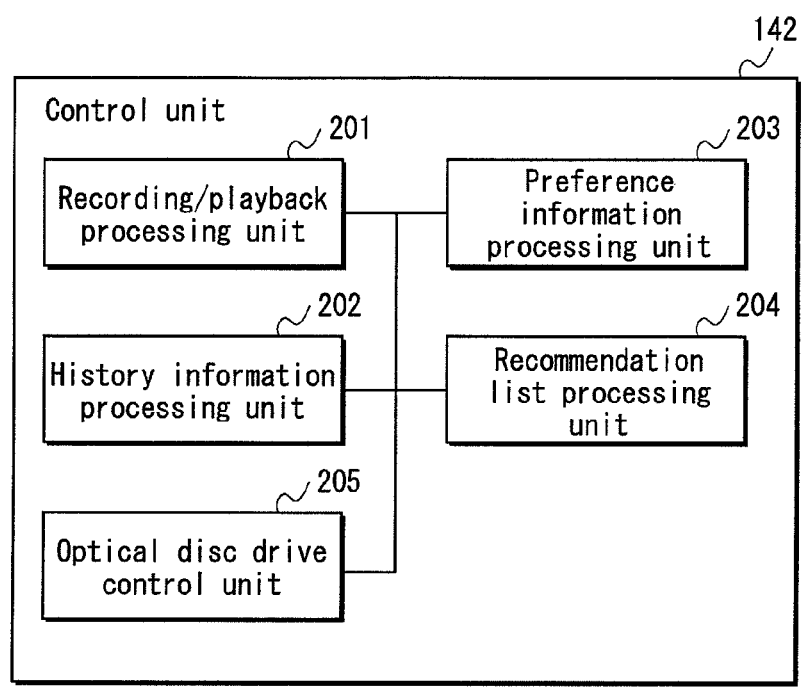
FIG. 2 is a functional block diagram of the control unit.

The control unit 142 controls the functions provided in the terminal device 140. More specifically, as shown in FIG. 2, the control unit 142 includes a recording/playback processing unit 201, a history information processing unit 202, a preference information processing unit 203, a recommendation list processing unit 204, and an optical disc drive control unit 205.

The recording/playback processing unit 201 records contents received from the content transmitting device 110 into the storage unit 144, and plays back a content stored in the storage unit 144 to display the content on the display device 150.

The history information processing unit 202 has a function to record a history of operations regarding viewing of contents into the storage unit 144, as history information.

Details of the history information will be described later. The history information includes IDs of contents, information of the contents (titles, genres, explanation, and so on), types of operations regarding the contents (recording, playback, and writing), and "operation date-time".

For example, when a recording operation for a content is received from the user, the history information processing unit 202 sets the type of operation to "recording", generates a piece of history information indicating the date-time at which the recording was performed, as the "operation date-time", and adds the generated piece of history information into the currently stored history information.

The preference information processing unit 203, when the contents are written from the storage unit 144 to the optical disc 170, generates preference information which indicates what contents the user is interested in, and records the generated preference information into the storage unit 144 or the optical disc 170. Details of the preference information will be described later.

The recommendation list processing unit 204 generates, based on the preference information, a list of contents that are recommendations for the user (hereinafter the list is referred to as "recommendation list").

For example, when a content stored in the optical disc 170 is played back, the recommendation list processing unit 204 generates a recommendation list by checking the preference information stored in the optical disc 170, together with the content list received from the content list transmitting device 120.

The optical disc drive control unit 205 has a function to read data from the optical disc loaded in the optical disc drive 146 by controlling the optical disc drive 146, and a function to write data onto the optical disc.

The date-time management unit 143 is composed of, for example, a clock circuit, and has a function to manage the current date-time.

Figure 3:
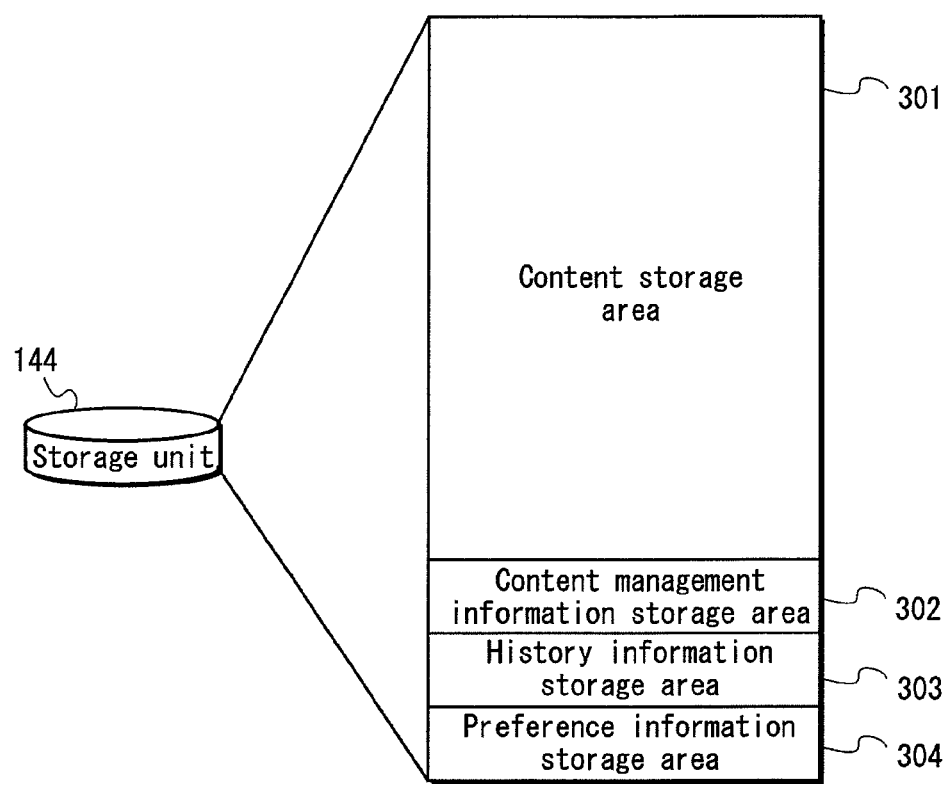
FIG. 3 illustrates the contents stored in the storage unit.

The storage unit 144 has a function to record a variety of information, and is composed of, for example, a Hard Disk Drive (HDD) having a capacity of several hundreds of GigaBytes (GB). More specifically, as shown in FIG. 3, the storage unit 144 includes a content storage area 301 for storing contents, a content management information storage area 302 for storing content management information being management information of the stored contents (the content management information will be described in detail later), a history information storage area 303 for storing history information recorded by the history information processing unit 202, and a preference information storage area 304 for storing preference information generated by the preference information processing unit 203.

The input/output unit 145 performs data transfers with external devices. For example, the input/output unit 145 receives input from the input device 160 and outputs video or audio data to the display device 150.

The optical disc drive 146 reads data from the optical disc and writes data onto the optical disc based on instructions from the optical disc drive control unit 205 of the control unit 142. The optical disc drive 146 includes, as hardware, a tray in which the optical disc is to be set (laid), and an optical pickup for reading data from the optical disc set in the tray.

Figure 4:
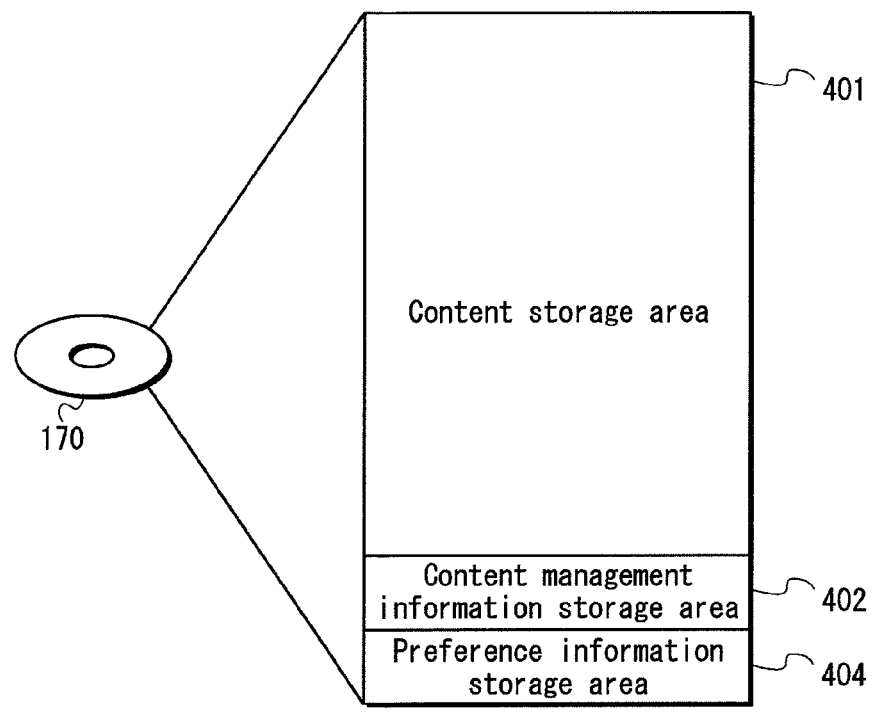
FIG. 4 illustrates the contents stored in the optical disc.

FIG. 4 illustrates the contents stored in the optical disc 170.

Note that FIG. 4 shows the optical disc 170 on which contents have been written. The optical disc 170 includes a content storage area 401 for storing contents, a content management information storage area 402 for storing content management information, and a preference information storage area 404 for storing preference information.

<Data>

The following describes each of the content management information, history information, and preference information in detail.

Figure 5A:
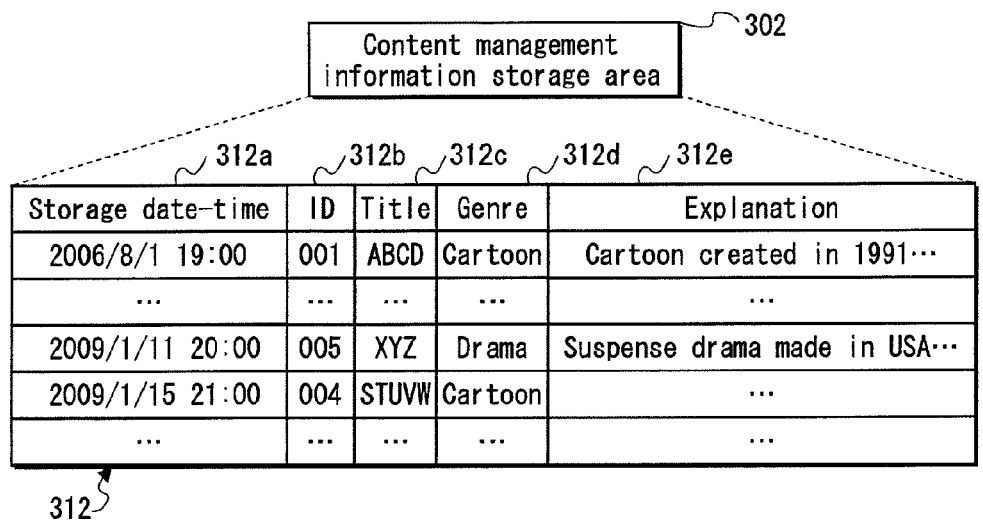
FIGS. 5A and 5B show examples of the content management information.
Figure 5B:
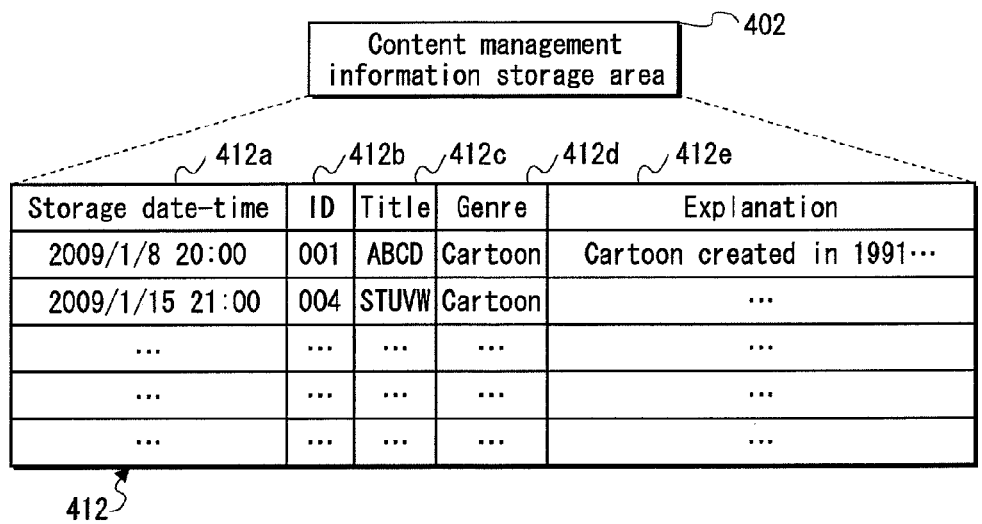

FIGS. 5A and 5B show examples of the content management information. FIG. 5A shows content management information 312 stored in the storage unit 144 of the terminal device 140, and FIG. 5B shows content management information 412 stored in the optical disc 170.

As shown in FIG. 5A, the content management information 312 includes items: "storage date-time" 312a; "ID" 312b; "title" 312c; "genre" 312d; and "explanation" 312e.

The "storage date-time" 312a is an item indicating dates and times at which respective contents were stored into the content storage area 301, namely into the terminal device 140.

The "ID" 312b is an item indicating IDs identifying the respective contents.

The "title" 312c is an item indicating titles of the respective contents.

The "genre" 312d is an item indicating genres of the respective contents.

The "explanation" 312e is an item including information explaining the respective contents. More specifically, the information includes the creation year, cast, producer, comments, and story of each content.

Note that the items "title" 312c, "genre" 312d, and "explanation" 312e are filled with respective data by, for example, the control unit 142 based on the content list received by the 141.

The content management information 312 shown in FIG. 5A includes three entries (pieces) of content management information. The first entry includes "2006/8/1 19:00" as the storage date-time, "001" as the ID, "ABCD" as the title, "cartoon" as the genre, and "Cartoon created in 1991 . . . " as the explanation.

As shown in FIG. 5B, the content management information 412 includes items: "storage date-time" 412a; "ID" 412b; "title" 412c; "genre" 412d; and "explanation" 412e.

The "storage date-time" 412a is an item indicating dates and times at which respective contents were stored into the content storage area 401, namely stored (written) into the optical disc 170.

The remaining items "ID" 412b, "title" 412c; "genre" 412d; and "explanation" 412e are similar to the items 312b through 312e of the content management information 312 shown in FIG. 5A, and description thereof is omitted.

The content management information 412 shown in FIG. 5B includes two entries (pieces) of content management information. The first entry includes "2009/1/8 20:00" as the storage date-time, "001" as the ID, "ABCD" as the title, "cartoon" as the genre, and "Cartoon created in 1991 . . . " as the explanation.

Figure 6:
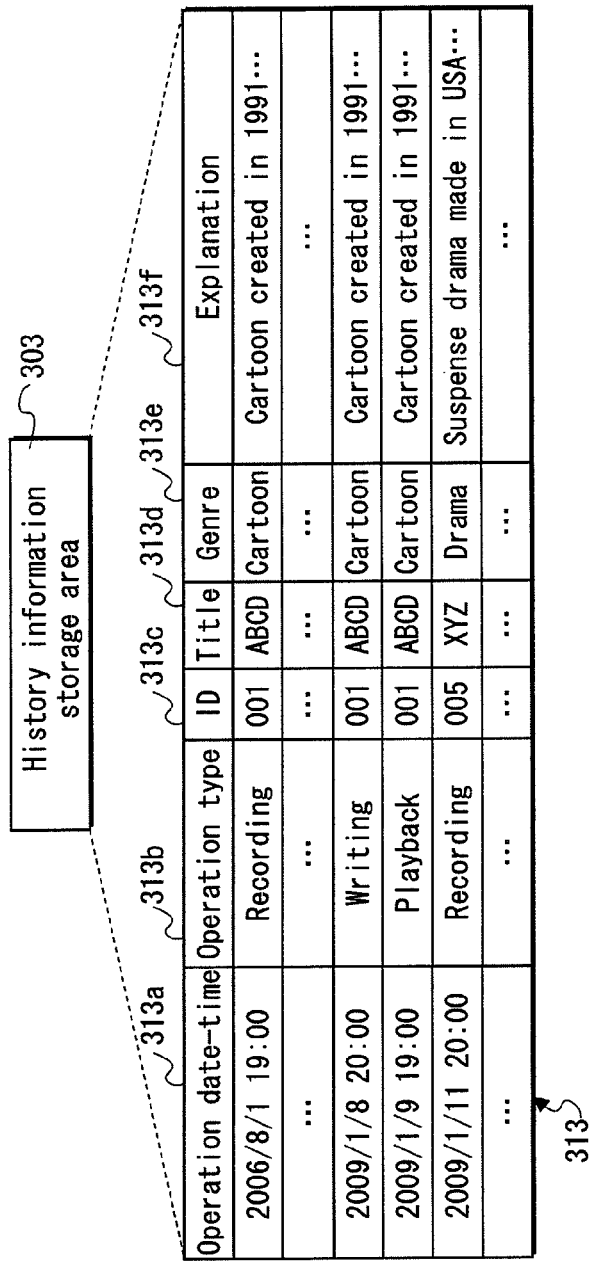
FIG. 6 shows an example of the history information.

FIG. 6 shows an example of the history information. History information 313 shown in FIG. 6 includes items: "operation date-time" 313a; "operation type" 313b; "ID" 313c; "title" 313d; "genre" 313e; and "explanation" 313f.

The "operation type" 313b is an item indicating types of operations. In the example shown in FIG. 6, there are three types of operations: "recording"; "writing"; and "playback".

The "operation date-time" 313a is an item indicating dates and times at which the operations regarding viewing of the contents were performed.

For example, when the recording/playback processing unit 201 records a content in accordance with a content recording instruction received by the input/output unit 145 from the input device 160, the data and time at which the recording was performed is recorded as the operation date-time. Similarly, when a content is played back, the data and time at which the playback was performed is recorded; and when a content is written onto an optical disc or the like, the data and time at which the writing was performed is recorded.

The remaining items "ID" 313c; "title" 313d; "genre" 313e; and "explanation" 313f are similar to the items 312b through 312e of the content management information 312 shown in FIG. 5A.

The history information 313 shown in FIG. 6 includes four entries (pieces) of history information. The first entry includes "2006/8/1 19:00" as the operation date-time, "recording" as the operation type, "001" as the ID, "ABCD" as the title, "cartoon" as the genre, and "Cartoon created in 1991 . . . " as the explanation. That is to say, the first entry of the history information indicates that the content "ABCD" was recorded at "2006/8/1 19:00".

Similarly, the second entry of the history information indicates that the content "ABCD" was written onto an optical disc or the like at "2009/1/8 20:00".

Also, the third entry of the history information indicates that the content "ABCD" was played back at "2009/1/9 19:00".

Further, the fourth entry of the history information indicates that the content "XYZ" was recorded at "2009/1/11 20:00".

Figure 7:
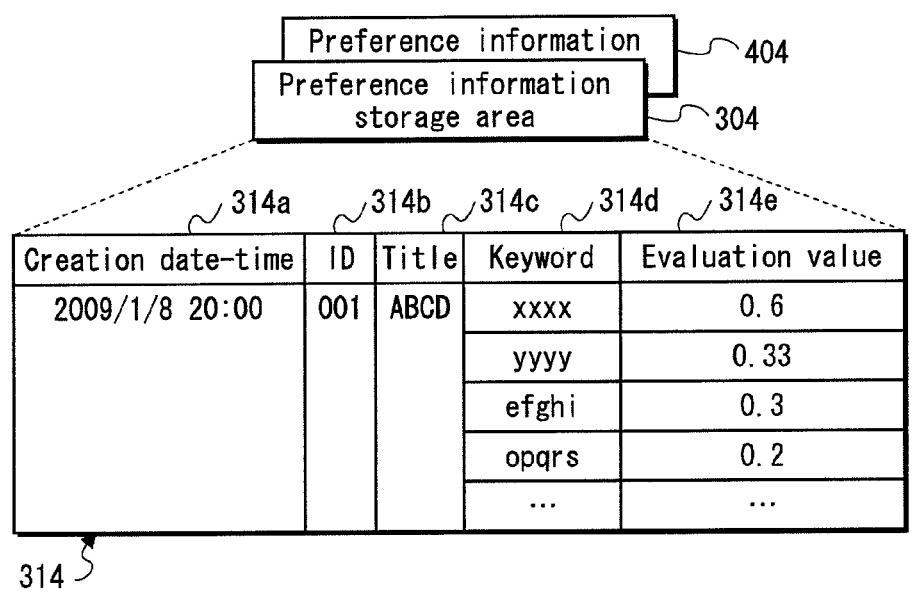
FIG. 7 shows an example of the preference information.

FIG. 7 shows an example of preference information stored in the preference information storage area 304 of the terminal device 140 or in the preference information storage area 404 of the optical disc 170.

Preference information 314 shown in FIG. 7 includes items: "creation date-time" 314a; "ID" 314b; "title" 314c; "keyword" 314d; and "evaluation value" 314e.

The "creation date-time" 314a is an item indicating the date and time at which the preference information was created. The "keyword" 314d is an item indicating keywords extracted from a predetermined number of pieces of history information among all pieces of history information included in the history information 303 shown in FIG. 6. In the case of the preference information 314 shown in FIG. 7, keywords "xxxx", "yyyy", "efghi", and "opqrs" have been extracted and sorted in the descending order of the evaluation value.

The "evaluation value" 314e is an item indicating evaluation values that are scores corresponding to the appearance frequencies of the keywords. The higher frequency the keyword appears at, the higher the evaluation value is. As the evaluation value, for example, a value obtained by normalizing the appearance frequency of the keyword extracted from the predetermined number of pieces of history information, by the appearance frequency of the keyword in the whole history information, may be used.

The preference information 314 shown in FIG. 7 indicates that a piece of preference information was created at "2009/1/8 20:00" when a content with title "ABCD" and ID "001" was written onto the optical disc (as will be described later, generally, the preference information is created when a content is written). Also, it is understood from the items "keyword" 314d and "evaluation value" 314e that the evaluation value "0.6" of the keyword "xxxx" is the highest. That is to say, the user of the terminal device 140 is highly interested in the contents related to "xxxx".

<Operation>

The following describes the operation of the terminal device 140.

Figure 8:
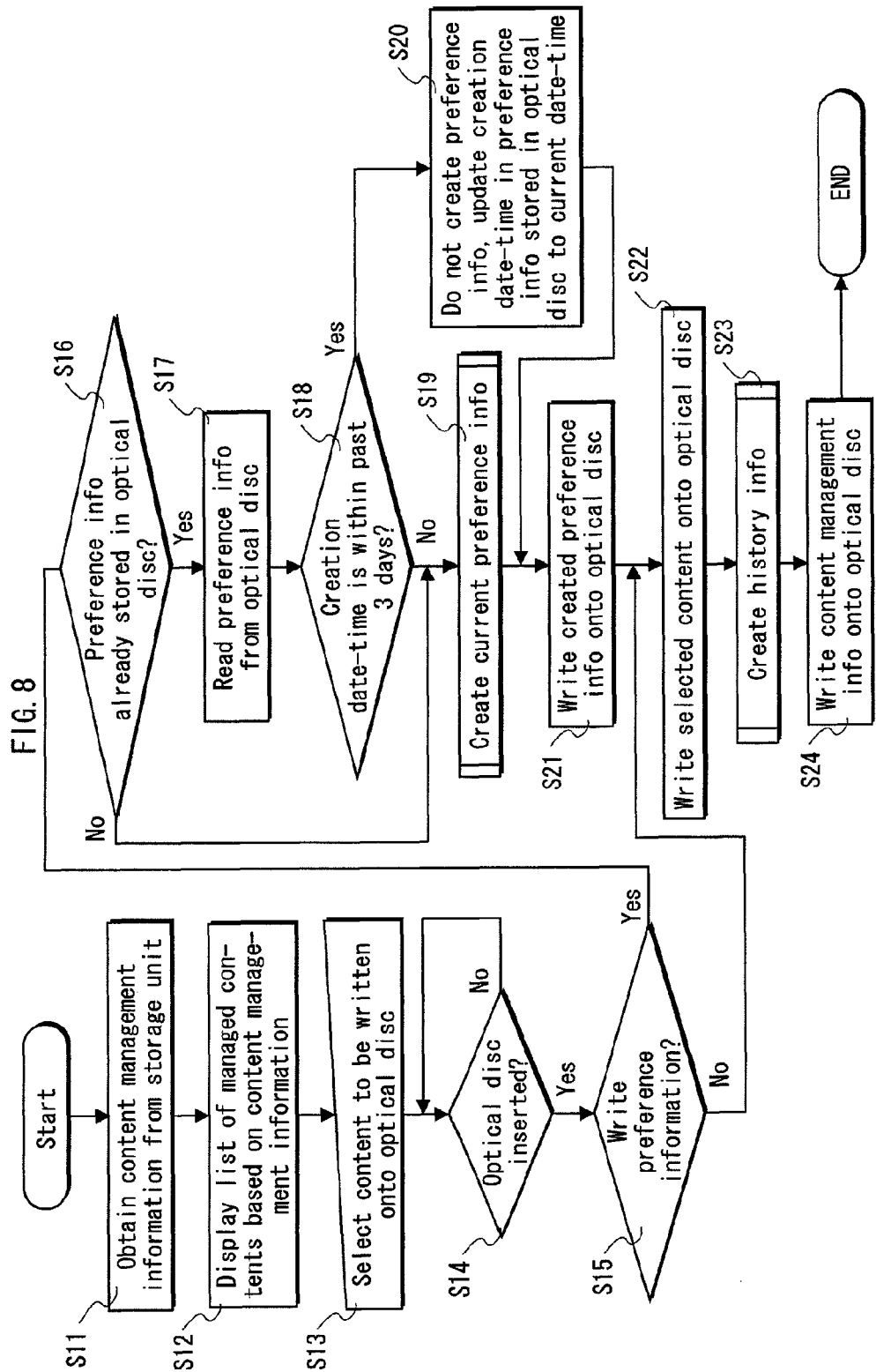
FIG. 8 is a flowchart showing the flow of the process in which a content stored in the terminal device is written onto the optical disc.

FIG. 8 is a flowchart showing the operation when a content stored in the terminal device 140 is written onto the optical disc 170.

First, the control unit 142 obtains the content management information from the content management information storage area 302 of the storage unit 144 (S11). The control unit 142 then causes the display device 150 to display based on the obtained content management information (S12). What is displayed here may be the content management information 312 in the form of a list, a menu of contents for playback that correspond to the content management information, or a menu including thumbnails taken out from the contents.

Following this, the control unit 142 receives, from the user via the input/output unit 145, selection of a content to be written onto the optical disc 170 (S13).

Next, the optical disc drive control unit 205 of the control unit 142 judges whether or not the optical disc 170 has been inserted in the optical disc drive 146 (S14). When it judges that the optical disc has not been inserted (S14: No), the control unit 142 urges the user to insert an optical disc by displaying a message "Please insert a disc" on the display device 150, or by opening the tray of the optical disc drive 146.

When it judges that the optical disc has been inserted (S14: Yes), the control unit 142 judges whether or not the preference information should be written onto the optical disc 170 (S15). For the judgment to be made, for example, the control unit 142 may display "Do you want to store preference information in an external recording medium?" on the display device 150 to urge the user to input selection to the input device 160 each time a content is written to the disc, or the initial settings of the terminal device 140 may include a setting on whether or not to store preference information along with each writing of a content.

When it is judged that the preference information should be written onto the optical disc 170 (S15: Yes), the optical disc drive control unit 205 judges, by reading the optical disc 170 inserted in the optical disc drive 146, whether or not the preference information has already been stored in the optical disc (S16).

When it judges that the preference information has already been stored (S16: Yes), the optical disc drive control unit 205 reads the preference information from the optical disc 170 (S17). Note that when a plurality of pieces of preference information are stored in the optical disc 170, the optical disc drive control unit 205 reads out a piece of preference information with the latest creation date-time.

Next, the control unit 142 judges whether or not the creation date-time of the read-out piece of preference information is within the past three days from the current date-time (S18). For example, in the case of the preference information shown in FIG. 7, in which the "creation date-time" 314a is "2009/1/8 20:00", when the current date-time (the date-time at which the writing onto the optical disc 170 was performed) is "2009/2/8 10:00", it is judged that the date-time of the read-out piece of preference information is not within the past three days.

When it is judged that the date-time of the read-out piece of preference information is not within the past three days (S18: No), or when it is judged that the preference information has not been stored (S16: No), the control proceeds to step S19 to create current preference information.

When it is judged that the date-time of the read-out piece of preference information is within the past three days (S18: Yes), the control unit 142 does not create the preference information, and the optical disc drive control unit 205 updates (overwrites) the creation date-time in the preference information stored in the optical disc 170 to (with) the current date-time (S20). This arrangement is made to reduce the processing load by skipping the creation of the preference information (S19) based on the consideration that in general, the contents of the preference information do not change greatly within three days.

Figure 9:
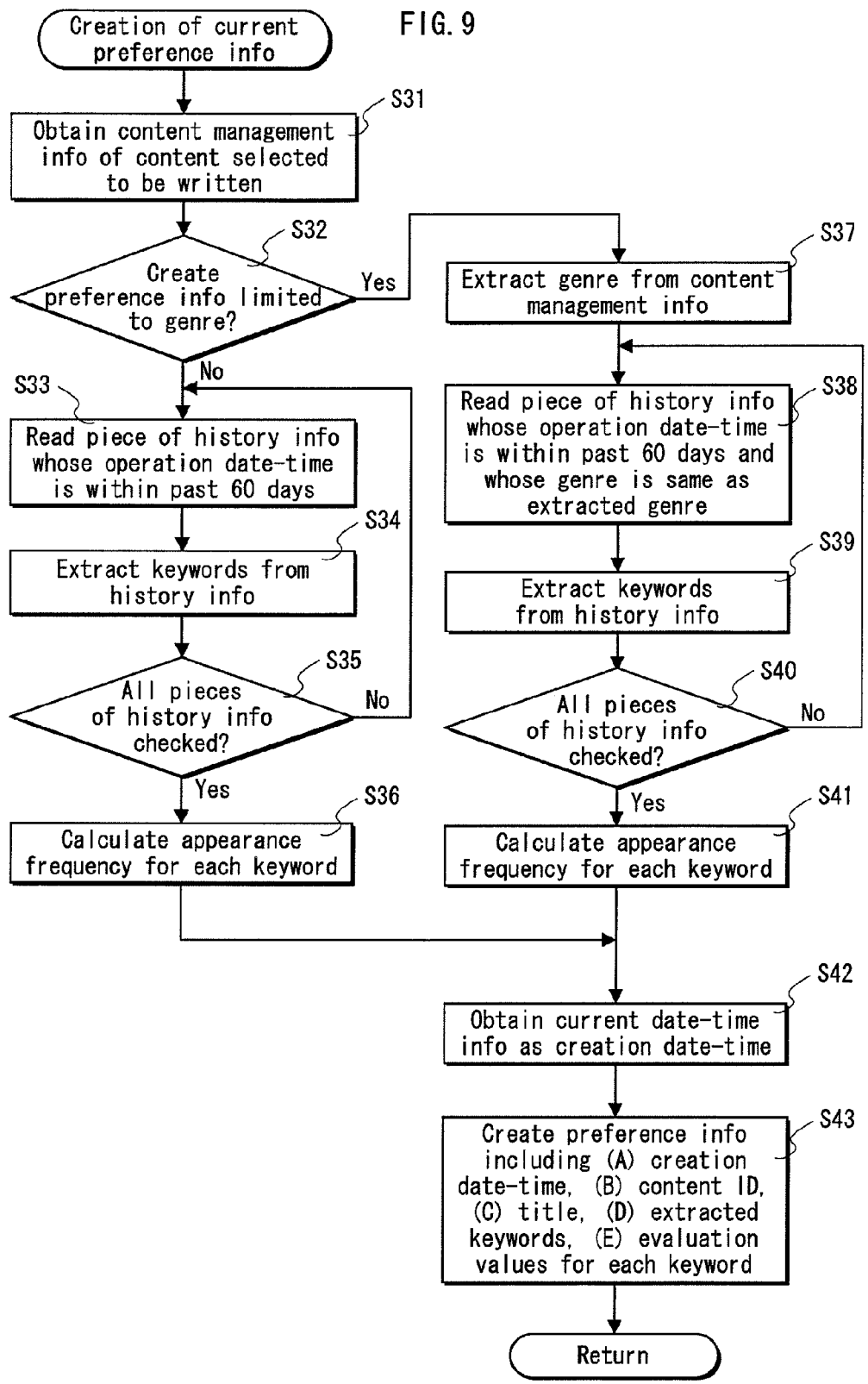
FIG. 9 is a flowchart showing details of the process of creating the current preference information.

Next, the process of creating the current preference information will be described with reference to FIG. 9.

First, the preference information processing unit 203 obtains the content management information of the content selected to be written in step S13 (S31).

Following this, the preference information processing unit 203 judges whether or not the preference information to be created should be limited to the genre of the content to be written (S32). For the judgment to be made, for example, when the content to be written is "ABCD" (genre: cartoon) shown in FIG. 5A, the preference information processing unit 203 may display "Do you want to limit preference information to be stored to the cartoon?" on the display device 150 to urge the user to determine each time a content is recommended to the user, or the initial settings of the terminal device 140 may include a setting on whether or not to limit the preference information to a same genre. Also, when a plurality of contents of different genres are selected to be written in step S13 (for example, when two respective contents of genres "cartoon" and "drama" are selected), it may be judged in step S32 that the preference information to be created should not be limited to the genre of the content to be written.

When it is judged that the preference information to be created should not be limited to the genre of the content to be written (S32: No), the preference information processing unit 203 reads a piece of history information whose operation date-time is within the past 60 days from the current date-time (the date-time at which the preference information is created) from the history information storage area 303 of the storage unit 144 (S33). For example, when the current date-time is "2009/2/8 10:00", among the history information 313 shown in FIG. 6, an upper piece of history information has operation date-time "2006/8/1 19:00" which is not within the past 60 days, and the lower three pieces of history information have operation date-time such as "2009/1/8 20:00" which are within the past 60 days.

The preference information processing unit 203 then extracts keywords from the items "title", "genre", and "explanation" of the read-out history information (S34). For example, in the case of a piece of history information with title "XYZ" among the history information 303 shown in FIG. 6, "XYZ", "drama", "USA", "suspense" and the like are extracted as keywords from the title "XYZ", genre "drama", and explanation "Suspense drama made in USA". This extraction can be realized by checking the history information against a dictionary database which includes a lot of words that can be extracted as the keywords.

More specifically, the dictionary database includes several thousands or several ten thousands of various words that can be extracted as the keywords, such as personal names (cast, producers and the like), genres (cartoon, drama, diet and the like), geographical names (USA, Japan and the like), and names of physical entities (automobile, apple and the like), and the keywords are extracted by checking the history information against the dictionary database. Note that the keyword extraction method is not limited to this, but, for example, a general syntax analysis technology may be used instead.

The preference information processing unit 203 repeats the steps S33 and S34 (S35: No), and when it confirms that all pieces of history information have been checked (S35: Yes), it calculates the appearance frequency for each of the extracted keywords (S36).

When it is judged that the preference information to be created should be limited to the genre of the content to be written (S32: Yes), the preference information processing unit 203 extracts the genre from the content management information of the content selected to be written in step S13 (S37). Following this, the preference information processing unit 203 reads a piece of history information whose operation date-time is within the past 60 days from the current date-time and whose genre is the same as the extracted genre (S38). For example, when the current date-time is "2009/2/8 10:00" and the genre extracted in step S37 is "drama", among the history information 313 shown in FIG. 6, only a piece of history information whose operation date-time is "2009/1/11 20:00", which is within the past 60 days, and whose genre is "drama" becomes the target of reading in step S38.

Following this, the preference information processing unit 203, as in steps S33 and S34, continues to extract keywords from the read-out history information until it confirms that all pieces of history information have been checked (S39, S40), and calculates the appearance frequency for each of the extracted keywords (S41).

The preference information processing unit 203 then obtains the current date-time information as the creation date-time from the date-time management unit 143 (S42). The preference information processing unit 203 then creates preference information including: (A) the creation date-time obtained in step S42; (B) the ID of the content selected to be written in step S13; (C) the title; (D) the keywords extracted in step S34 or S39; and (E) the evaluation values represented by the appearance frequency calculated for each keyword in step S36 or S41 (S43).

Having completed the process of creating the current preference information as described above (FIG. 8, S19), the optical disc drive control unit 205 writes the created preference information onto the optical disc 170 (S21), and then writes the content selected to be written in step S13 onto the optical disc 170 (S22).

Figure 10:
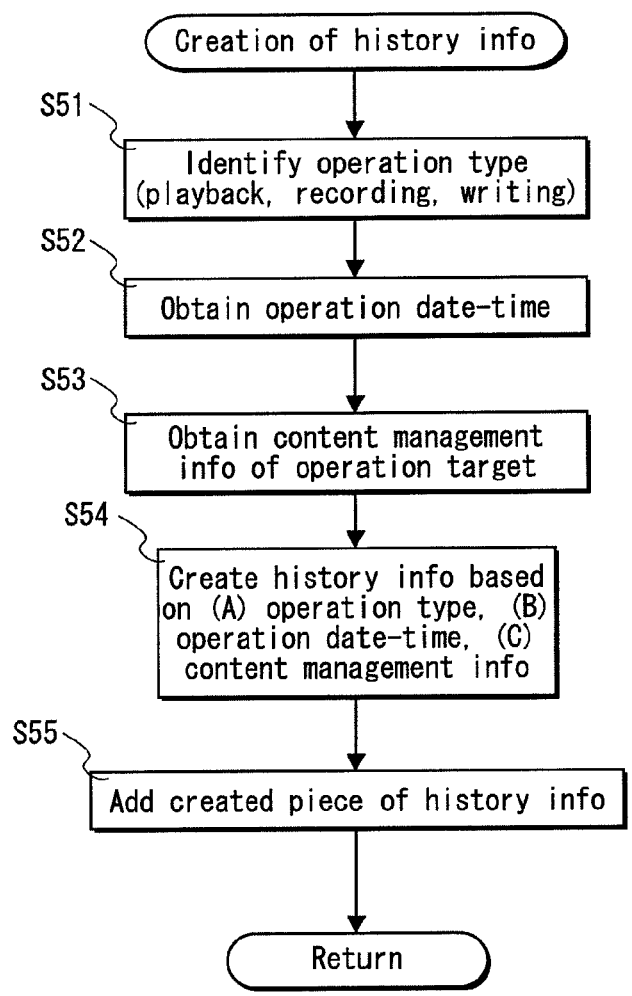
FIG. 10 is a flowchart showing details of the process of creating the history information.

Following this, the history information processing unit 202 creates the history information (S23). The process of creating the history information is shown in detail in FIG. 10.

It should be noted here that although, according to the flowchart shown in FIG. 8, the process of creating the history information (S23) is performed after step S22, the history information processing unit 202 creates a piece of history information in correspondence with each performance of an operation regarding viewing of contents.

First, the history information processing unit 202 identifies the operation type (S51). When the step S51 is performed after the step S22 is performed in the flowchart of FIG. 8, it identifies the operation type as "writing".

Next, the history information processing unit 202 obtains the operation date-time from the date-time management unit 143 (S52), and obtains the content management information of the operation target (S53).

The history information processing unit 202 then creates a piece of history information based on the three elements: (A) the operation type identified in step S51; (B) the operation date-time obtained in step S52; and (C) the content management information obtained in step S53 (S54), and adds the created piece of history information into the history information stored in the history information storage area 303 (S55).

Having completed the process of creating the history information as described above (FIG. 8, S23), the optical disc drive control unit 205 writes the content management information corresponding to the content written in step S22 onto the optical disc 170 (S24).

As described above, the three elements: the preference information (S21); the content (S22); and the content management information (S24), are written onto the optical disc 170 (see FIG. 4).

Figure 11:
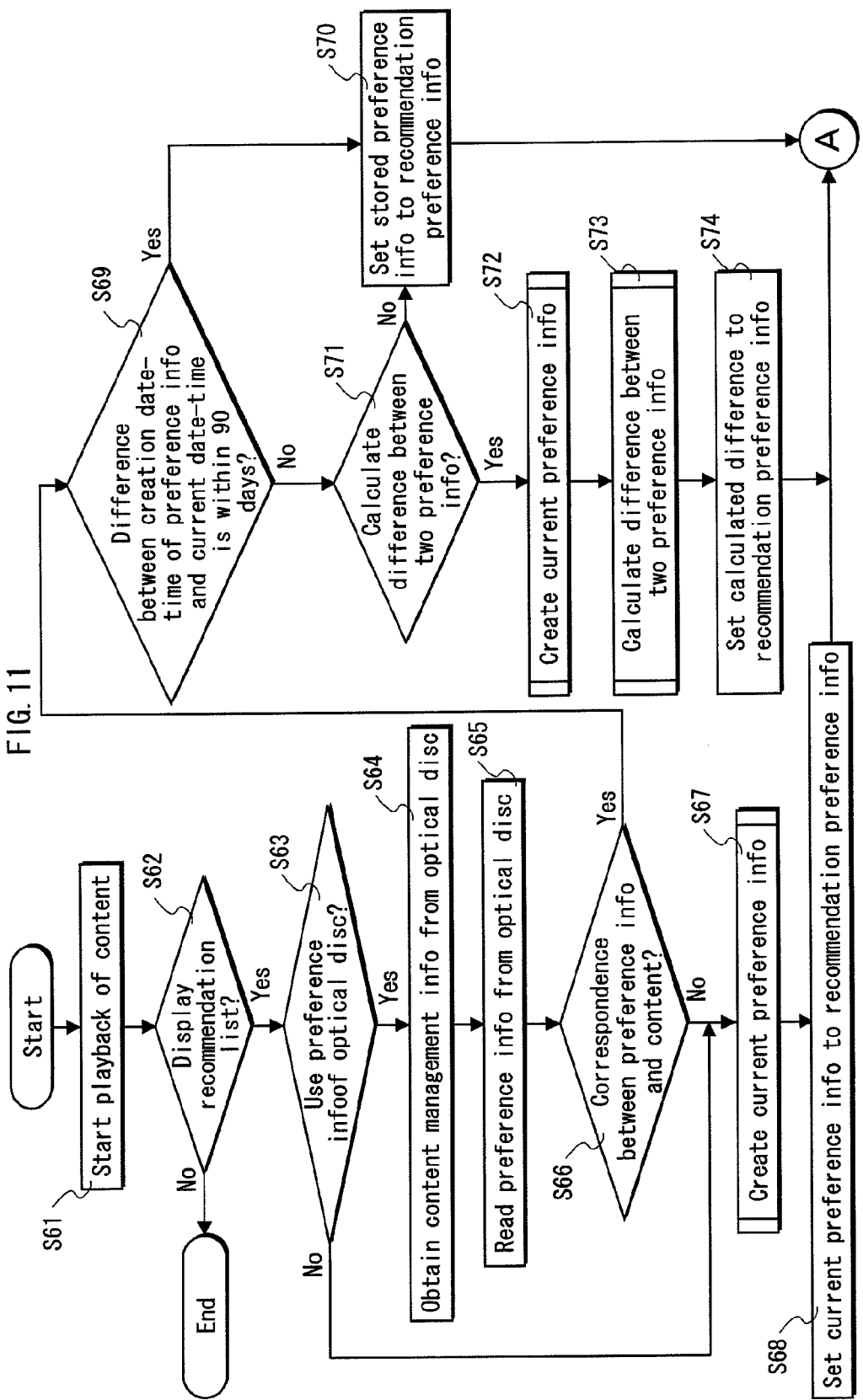
FIG. 11 is a flowchart showing details of the process of displaying the content recommendation list using the preference information written on the optical disc.

Next, the process of displaying the content recommendation list using the preference information written on the optical disc 170 will be described with reference to the flowchart shown in FIG. 11.

First, the recording/playback processing unit 201 starts a playback of a content written on the optical disc 170 inserted in the optical disc drive 146 (S61)

Following this, the recommendation list processing unit 204 judges whether or not the recommendation list should be displayed (S62). For the judgment to be made, for example, the recommendation list processing unit 204 may display "Do you want to display a recommendation list based on the preference information?" on the display device 150 to urge the user to input selection to the input device 160 each time a content is played back, or the initial settings of the terminal device 140 may include a setting on whether or not to display a recommendation list, or the recommendation list may be displayed at the timing when the content started to be played back in step S61 reaches a certain point such as an end of playback.

When it judges that the recommendation list should be displayed (S62: Yes), the recommendation list processing unit 204 judges whether or not the preference information stored in the optical disc should be used (S63). When it judges that the preference information stored in the optical disc should be used (S63: Yes), the recommendation list processing unit 204 obtains the content management information of the content started to be played back in step S61, from the optical disc 170 (S64), and reads the preference information from the optical disc 170 (S65).

After this, the recommendation list processing unit 204 judges whether or not there is a correspondence between the content included in the preference information read out in step S65, and the content indicated by the content management information obtained in step S64 (namely, the content started to be played back in step S61) (S66).

For this judgment, the IDs of both contents are checked against each other. For example, when the read-out preference information is the preference information 314 shown in FIG. 7, the ID of the content is "001". In this case, if the ID of the content started to be played back in step S61 is also "001", it is judged that there is a correspondence since both IDs are identical.

When it is judged that there is no correspondence between the contents (S66: No), the 203 creates the current preference information (S67), and the recommendation list processing unit 204 determines the created current preference information as the recommendation preference information (S68). The step S67 is similar to step S19 (see FIGS. 8 and 9), thus detailed description thereof is omitted.

When it is judged that there is a correspondence between the contents (S66: Yes), it is judged whether or not the difference between the creation date-time of the preference information and the current date-time (the date-time at which the content is played back) is within 90 days.

When it is judged that the difference between the creation date-time of the preference information and the current date-time is within 90 days (S69: Yes), which means that the preference information is relatively new, the recommendation list processing unit 204 determines the preference information stored in the optical disc 170 as the recommendation preference information (S70).

When it is judged that the difference between the creation date-time of the preference information and the current date-time is not within 90 days (S69: No), which means that the preference information is relatively old, and it is judged that the difference between two pieces of preference information should be calculated (S71: Yes), the preference information processing unit 203 creates the current preference information (S72), and calculates the difference between two pieces of preference information (S73). Note that step S72 is also similar to step S19.

Figure 12:
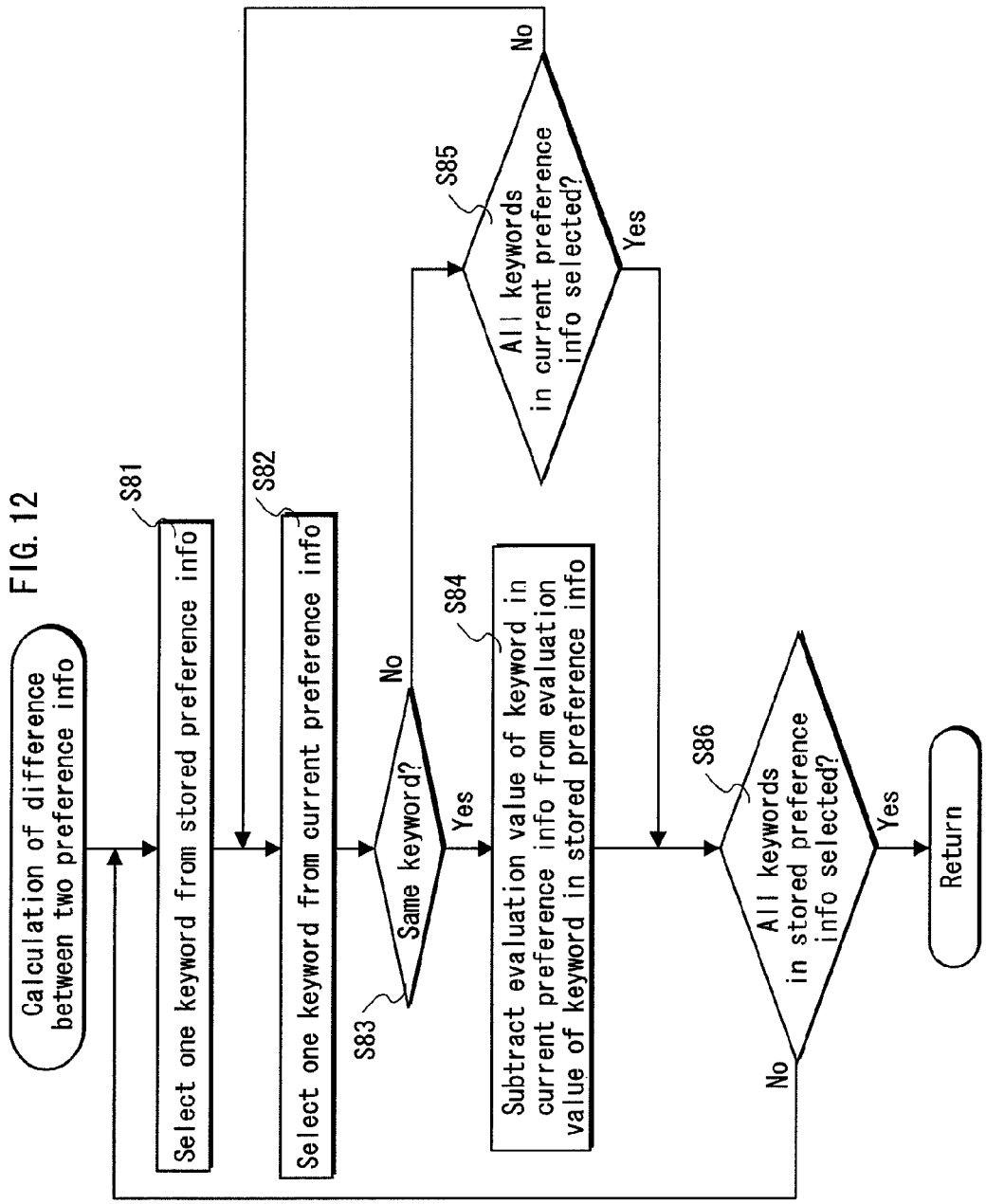
FIG. 12 shows the procedure for calculating the difference between two pieces of preference information.

FIG. 12 shows the procedure for calculating the difference between two pieces of preference information. First, the preference information processing unit 203 selects one keyword from the preference information stored in the optical disc 170 (S81), and also selects one keyword from the current preference information created in step S72. When the two keywords are the same (S83: Yes), the preference information processing unit 203 subtracts the evaluation value of the keyword in the current preference information from the evaluation value of the keyword in the stored preference information (S84). When the two keywords are not the same (S83: No), the preference information processing unit 203 repeats the process of steps S82 through S83 until the same keyword is found (S83: Yes) or until all keywords in the current preference information are selected (S85: Yes).

Similarly, the preference information processing unit 203 repeats the process of steps S81 through S85 until all keywords in the stored preference information are selected (S86: Yes).

Figures 13A, 13B, 13C:
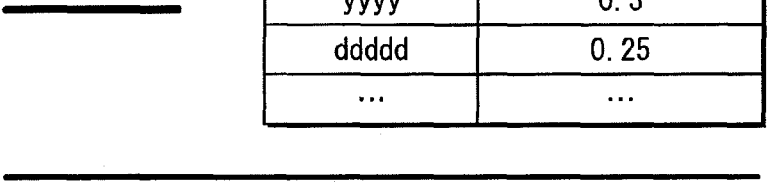
FIGS. 13A through 13C illustrate how the difference preference information between two pieces of preference information is generated.

FIGS. 13A through 13C illustrate how the difference between two pieces of preference information is calculated. As shown in FIGS. 13A through 13C, there are preference information stored in the optical disc 170 (FIG. 13A) and the current preference information (FIG. 13B). FIG. 13C shows the difference between the two preference information obtained by subtracting the current preference information (FIG. 13B) from the preference information stored in the optical disc 170 (FIG. 13A). It should be noted here that for the sake of simplicity, the items "creation date-time", "ID", and "title", which are included in the preference information shown in FIG. 7, are omitted in each piece of preference information shown in FIGS. 13A through 13C.

For example, with regard to keyword "yyyy", the evaluation value "0.3" thereof in the current preference information is subtracted from the evaluation value "0.33" in the stored preference information, and results in the evaluation value "0.03" in the difference between the two preference information. Note that when a negative value is obtained as a result of the subtraction, the resultant evaluation value may be treated as "0", or may be treated as a negative value as it is.

After the difference between two pieces of preference information is calculated in this way (FIG. 11, S73), the recommendation list processing unit 204 determines the calculated difference as the recommendation preference information (S74).

Figure 14:
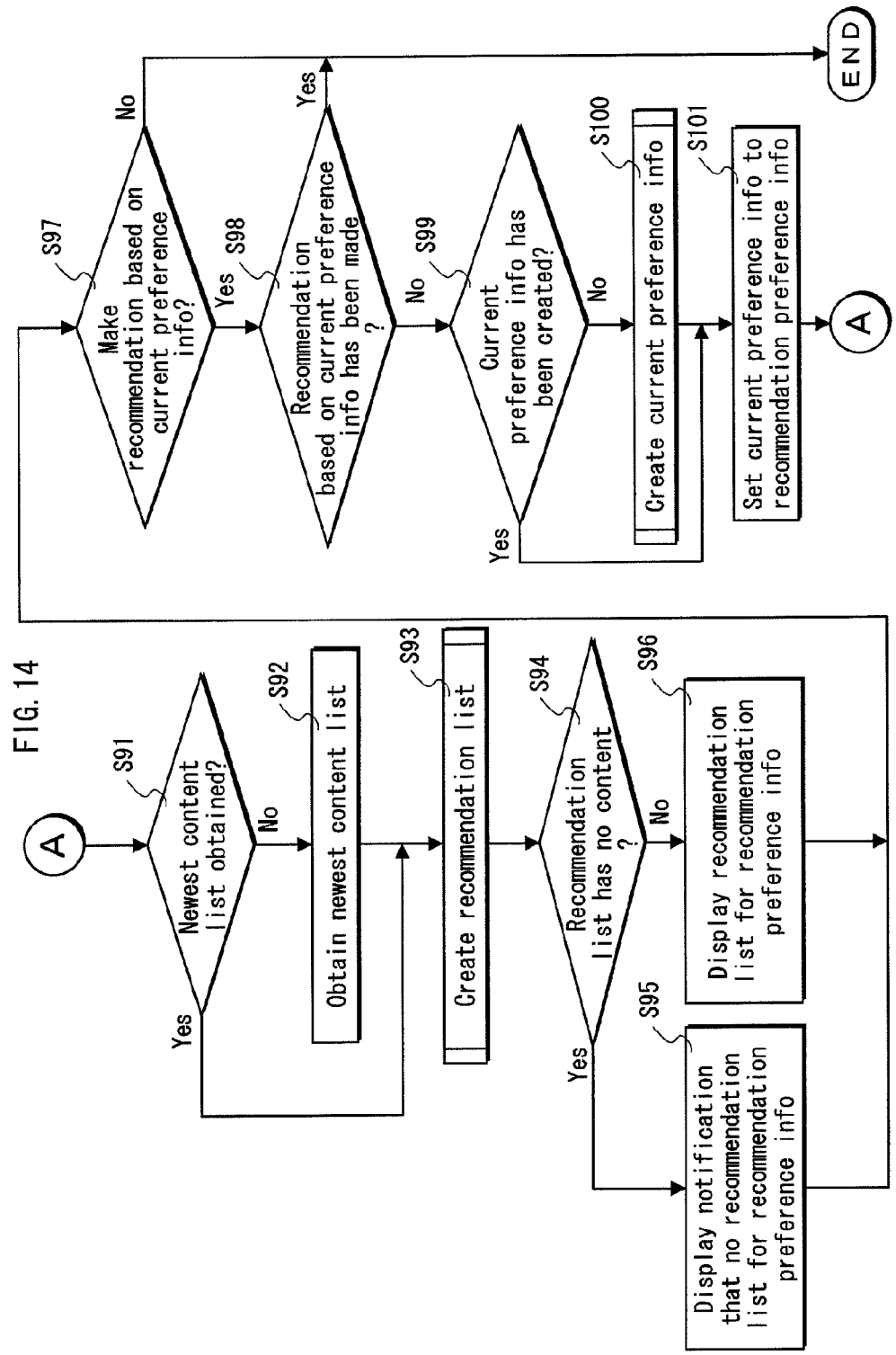
FIG. 14 is a flowchart showing the flow of the process in which the list of recommendation contents is displayed using the preference information written on the optical disc.

The process then passes through steps S68, S74 or S70 and proceeds to the steps shown in FIG. 14, in which first the recommendation list processing unit 204 judges whether or not the newest content list has been obtained (S91).

When it judges that the newest content list has not been obtained (S91: No), the recommendation list processing unit 204 obtains the newest content list from the content list transmitting device 120 (S92), and proceeds to step S93. Note that the control unit 142 creates the content management information based on the obtained newest content list, and stores it into the storage unit 144.

When it judges that the newest content list has been obtained (S91: Yes), the control proceeds to step S93.

Figure 15:
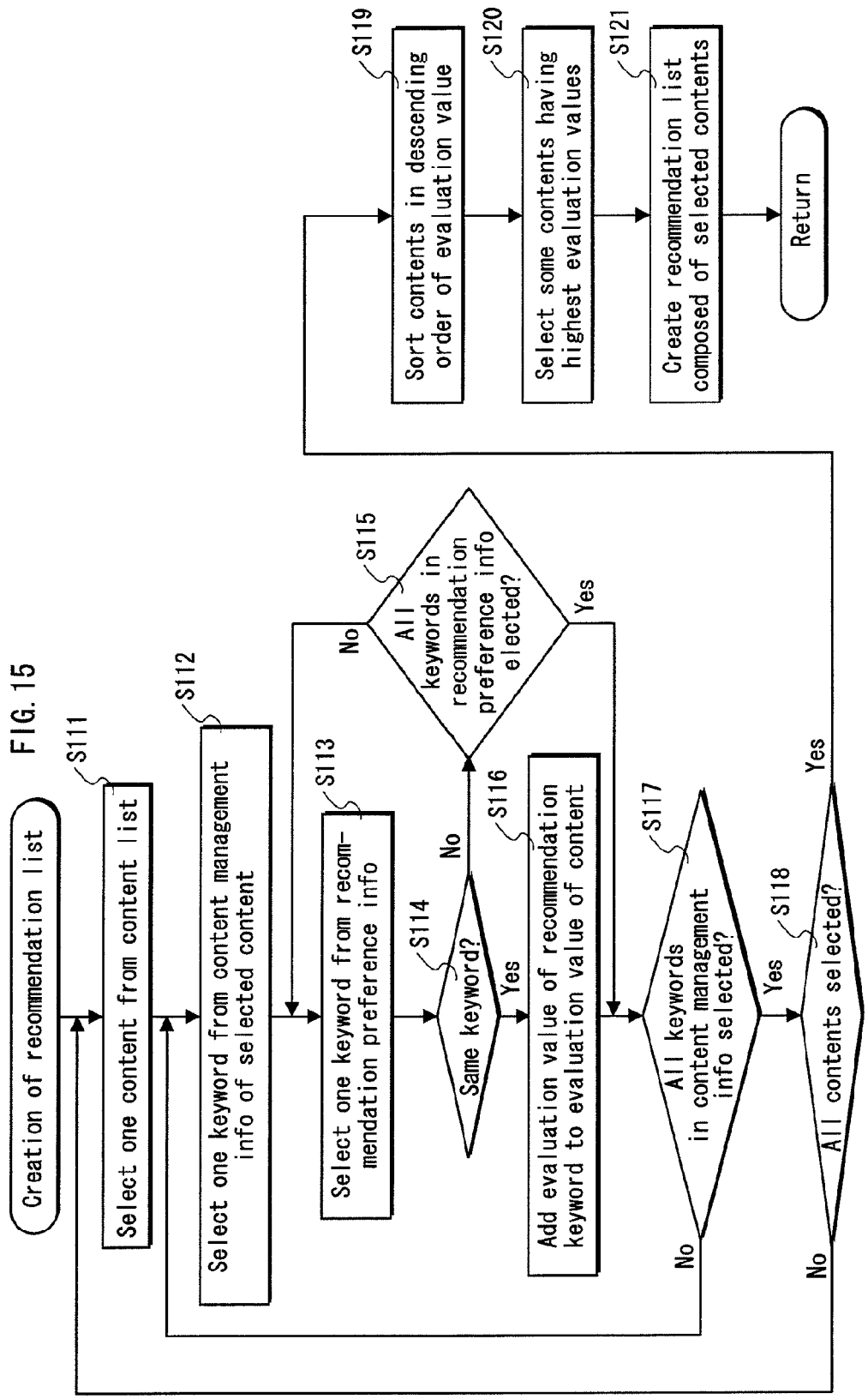
FIG. 15 is a flowchart showing details of the process of creating the recommendation list.

Here, the process of creating the recommendation list performed in step S93 will be described in detail with reference to FIG. 15.

First, the recommendation list processing unit 204 selects one content from the content list (S111).

The recommendation list processing unit 204 then selects one keyword from the content management information corresponding to the selected content (S112). Similarly, the recommendation list processing unit 204 selects one keyword from the recommendation preference information (S113). Following this, in step S114, it is judged whether or not both the keywords are the same. When the judgment result of step S114 is negative (S114: No), the control proceeds to step S115 in which it is judged whether or not all keywords in the recommendation preference information have been selected. When the judgment result of step S115 is negative (S115: No), the control returns to step S113. These steps are repeated until the same keyword is detected (S114: Yes) or all keywords in the recommendation preference information have been selected (S115: Yes).

When it is judged that both the keywords are the same (S114: Yes), the recommendation list processing unit 204 adds the evaluation value of the recommendation keyword to the evaluation value of the content (S116).

Here, it is explained how the contents are evaluated, with reference to FIGS. 16A through 16C. FIG. 16A shows the content management information corresponding to the latest content list. In this example, explanation of title "bcdef"

includes a keyword "xxxx". The recommendation preference information shown in FIG. 16b also includes the keyword "xxxx". Thus the recommendation list processing unit 204 selects the keyword "xxxx" from the content management information (S112), and selects the same keyword "xxxx" from the recommendation preference information (S113). Accordingly, the recommendation list processing unit 204 adds evaluation value "0.6" of the keyword "xxxx" to the evaluation value of content "bcdef". This process is performed in the same manner onto each keyword such as "pppp" included in the "explanation" of the content management information (S117).

After the process of steps S113 through S117 ends, the recommendation list processing unit 204 repeats the process until all contents have been selected (S118: Yes) so that the evaluation values of all contents in the content list are calculated.

The recommendation list processing unit 204 then sorts the contents in the descending order of evaluation value (S119), and selects some (for example, three) contents having highest evaluation values (in the sorted order) (S120).

The recommendation list processing unit 204 then creates a recommendation list composed of the selected contents (S121).

After the process of creating the recommendation list (FIG. 14, S93) is completed, the recommendation list processing unit 204 judges whether or not the recommendation list has no content (S94).

When it judges that the recommendation list has no content (S94: Yes), the recommendation list processing unit 204 causes the display device 150 to display a notification that there is no recommendation list corresponding to the recommendation preference information (S95). For example, when the recommendation preference information is the current preference information, it causes the display device 150 to display a message "there is no recommendations based on the current history".

When it is judged that the recommendation list has a content (S94: No), the recommendation list processing unit 204 causes the display device 150 to display the recommendation list for the recommendation preference information (S96). The display provided in step S96 will be described in detail later.

Next, when it judges that the recommendation based on the current preference information should be made (S97: Yes), and then judges that the recommendation based on the current preference information has not been made yet (S98: No), the recommendation list processing unit 204 executes steps S99 and S100 to prepare the current preference information.

After this, the recommendation list processing unit 204 sets the current preference information to the recommendation preference information (S101). After the setting, it performs steps S91 through S94 again, and when it judges that the recommendation list has a content (S94: No), the recommendation list processing unit 204 displays the recommendation list for the current preference information (recommendation preference information). An example of the display will be described later with reference to FIG. 20.

When it is judged that the recommendation based on the current preference information should not be made (S97: No), or when it is judged that the recommendation based on the current preference information has already been made (S98: Yes), the process ends.

FIG. 17 shows an example of the display provided in step S96. In the example shown in FIG. 17, it is presumed that the preference information stored in the optical disc 170 has been determined as the recommendation preference information (FIG. 11, S70).

In the example shown in FIG. 17, a ranking of recommendations is displayed, the recommendations being three contents that are included in the recommendation list having been created based on the recommendation preference information (the preference information stored in the optical disc 170). The "Detail" buttons 151a through 151c are linked to details of the corresponding contents. For example, when the user selects the "Detail" button 151a, the control unit 142 reads the content management information of the content titled "bcdef", and changes the screen to display the explanation of the content "bcdef" (not illustrated).

Note that in the screen shown in FIG. 17, the control unit 142 may display a "Playback" button which, when selected, causes the content "bcdef" to be played back immediately. Furthermore, in the case where the content "bcdef" is scheduled to be broadcast in future, the control unit 142 may display a "Recording-Preset" button which, when selected, presets recording of the content "bcdef".

In the upper part of the screen of FIG. 17, a message "Following are recommendations based on history as of "2009/2/8 10:00" when "STUVW" was written" is displayed. The message conveys the user that the recommendation list is based on the history as of "2009/2/8 10:00", not based on the current history.

The advantageous effects produced by the structure will be explained with reference to FIGS. 18 and 19.

Figure 18:
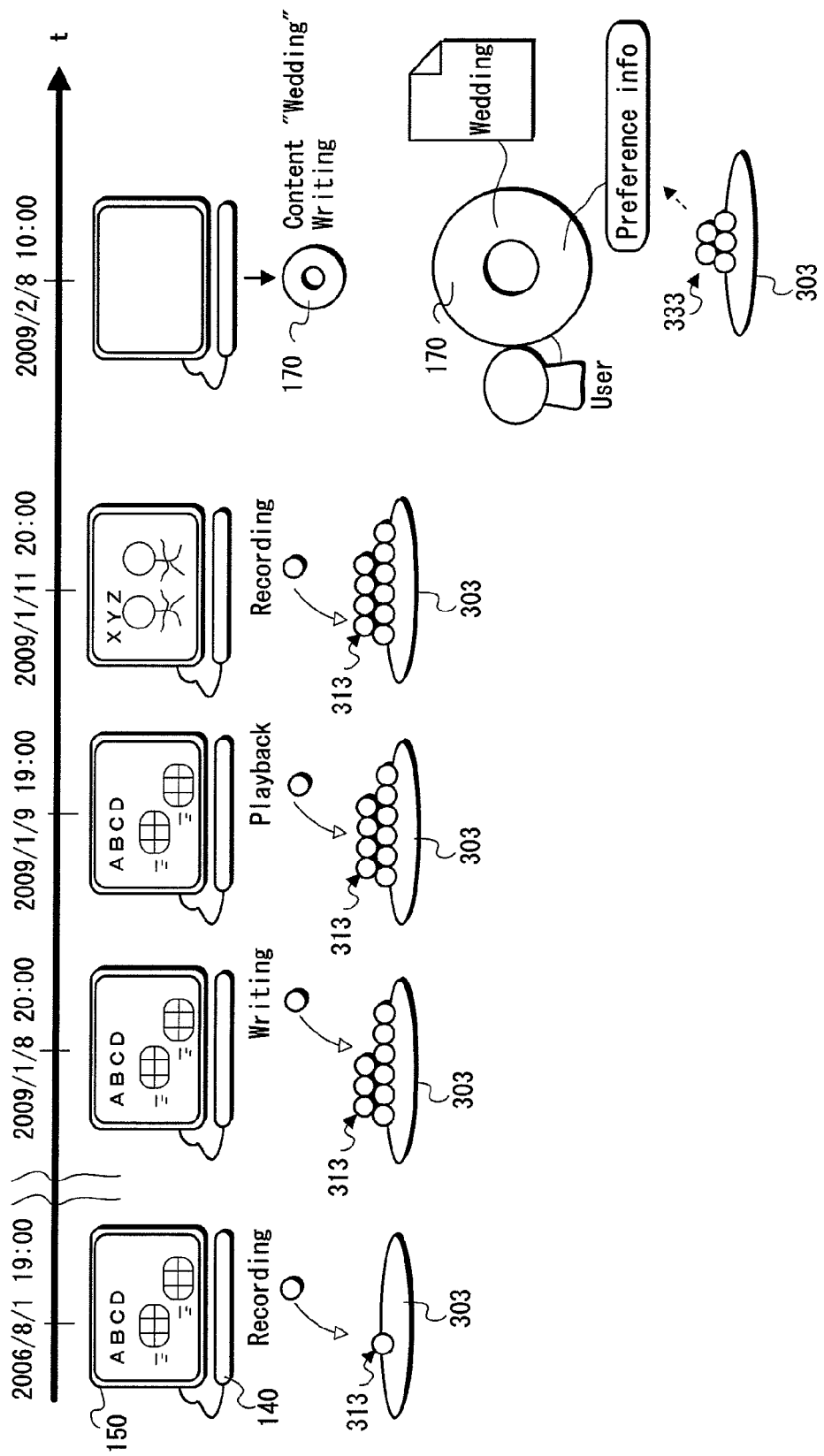
FIG. 18 shows how contents and preference information are written onto the optical disc.

As shown in FIG. 18, in the terminal device 140, each time an operation regarding viewing of a content is performed (a recording at 19:00 on 2006/8/1, a writing at 20:00 on 2009/1/8, a playback at 19:00 on 2009/1/9, and a recording at 20:00 on 2009/1/11), the information is added to the history information 313 stored in the history information storage area 303. And, for example, as shown in FIG. 18, when content "Wedding" stored in the terminal device 140 is written onto the optical disc 170 at 10:00 on 2009/2/8, the content "Wedding" and preference information as of "2009/2/8 10:00" are written onto the optical disc 170. The preference information written here has been created based on a predetermined number of pieces of history information 333 whose operation date-time is within the past 60 days from the current date-time (FIG. 9, S33, S38), or which are limited to a genre (FIG. 9, S37), among all pieces of history information 313 stored in the history information storage area 303.

Figure 19:
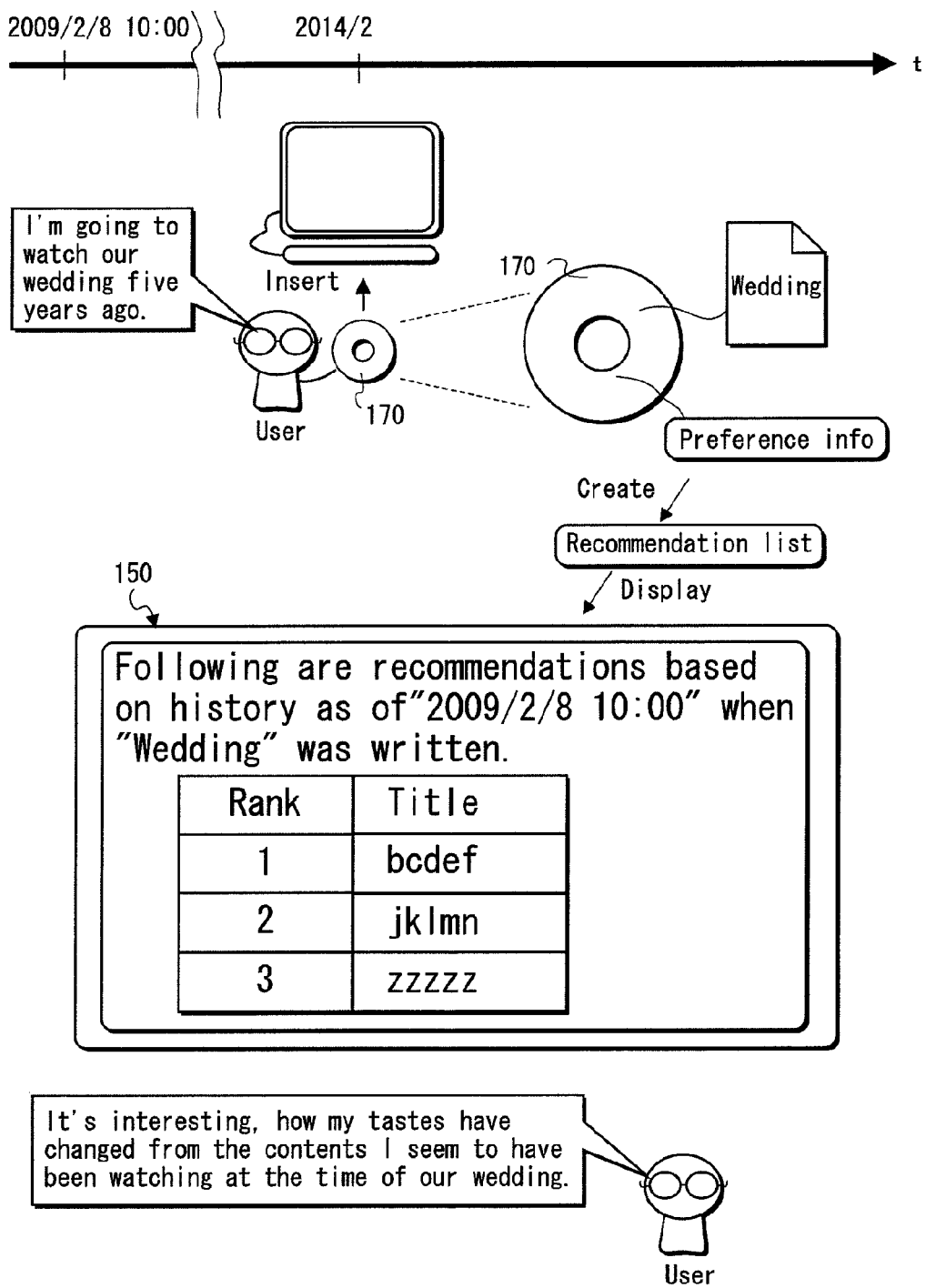
FIG. 19 shows how the recommendation list is displayed based on the preference information written on the optical disc.

Then as shown in FIG. 19, if the user inserts the optical disc 170 into the terminal device 140 to watch the content "Wedding" in February of 2014 that is five years after 2009, the terminal device 140 will display the recommendation list which is based on the preference of the user as of "2009/2/8 10:00", in accordance with the preference information written on the optical disc 170. That is to say, it is possible to display the recommendation list based on the preference of the user at the time of the wedding.

The above-described structure enables the user to remember his/her preference as of "2009/2/8 10:00". Suppose that the user's tastes as of 2014 have changed from those as of 2009, then the displayed recommendation list would have an element of surprise to the user and would be composed of contents favored by the user potentially.

That is to say, in general, a person's tastes change over time, and the user's preference at the present time is mostly different from that in the past. However, it is highly possible that what was attractive to the user in the past is attractive as well at the present time. For example, one is sometimes struck by a sense of familiarity when one hears by chance a tune that he/she used to listen to in the past. This example shows well that one's past preference remains potentially up to the present time. The example of FIG. 19 shows that it is possible to display a recommendation list including contents that are favored by the user potentially.

Also, by causing such a recommendation list to be displayed when the content "Wedding" in the optical disc 170 is played back, namely in the state where the content is linked with his/her preference at a time in the past, it is possible to remind the user of his/her preference at the time of the wedding. The judgment in step S66 is made to provide the linking.

Next, other two examples of display of the recommendation list will be described.

Figure 20:
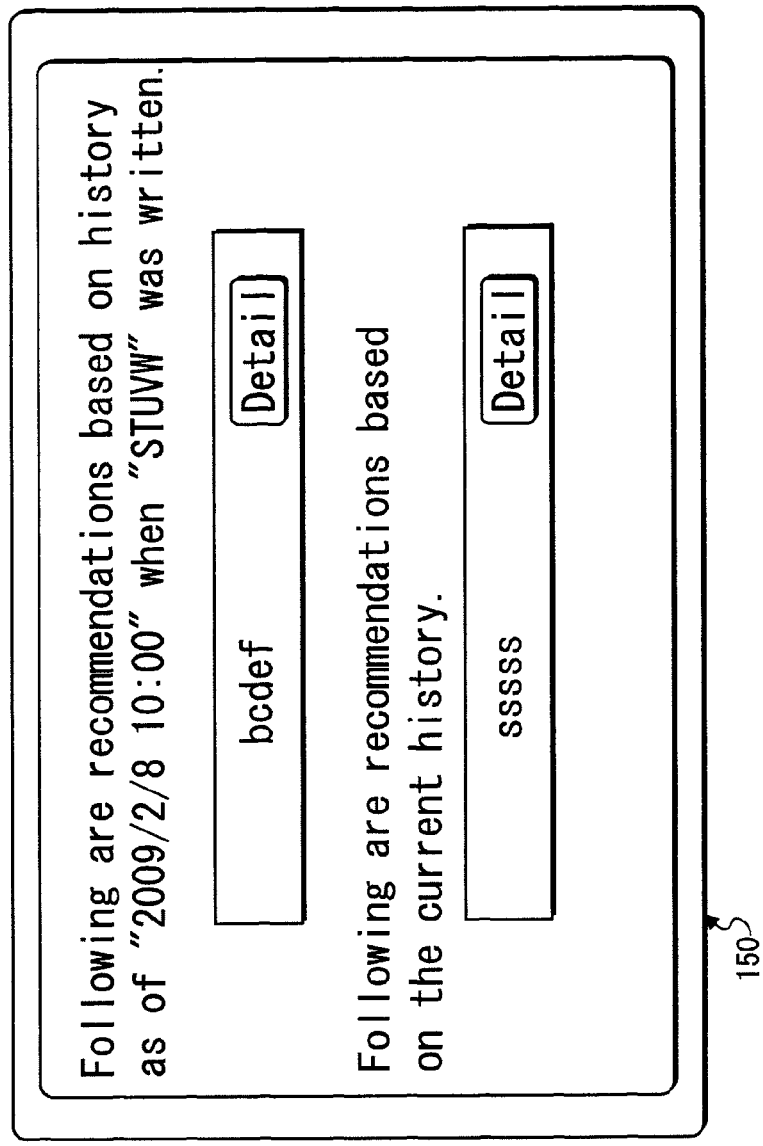
FIG. 20 shows an example of display of the recommendation list.

FIG. 20 shows display in one screen of two respective recommendation lists that were created based on the current preference information and the preference information stored in the optical disc 170.

In the example shown in FIG. 20, the content "bcdef" is the "recommendations based on history as of "2009/2/8 10:00" when "STUVW" was written", and the content "sssss" is the "recommendations based on the current history". Such display of recommendation lists expands the range of choices by the user. Also, it provides the user a chance to compare the current preference with the past preference of him/her.

FIG. 21 shows display of recommendation list based on the difference between preference information.

In the example shown in FIG. 21, the content "xxxx" is the "recommendations based on difference between history as of "2009/2/8 10:00" when "STUVW" was written and the current history". Also, the lower part of FIG. 21 shows a comment: "You seem to have been watching less cartoons recently", which is generated based on the fact that, in the preference information (stored preference information) at the time when the content was written onto the disc, contents belonging to the genre of "cartoon" have high evaluation values, whereas in the current preference information, contents belonging to the genre of "cartoon" have low evaluation values.

With such a display of recommendation list, it is possible to recommend to the user a surprising content that is not his/her preference at present, or cause the user to re-recognize a preference in the past that the user him/herself has forgotten.

Second Embodiment

In the first embodiment, when a content stored in the terminal device 140 is written onto the optical disc 170, the preference information is written onto the optical disc 170, as well.

On the other hand, in the second embodiment, when a content transmitted from the content transmitting device 110 is recorded into the storage unit 144, the preference information is stored into the storage unit 144, as well. Note that the process of displaying the list of recommendation contents by using the preference information stored in the storage unit 144 is similar to the process of the first embodiment, and description thereof is omitted here.

Figure 22:
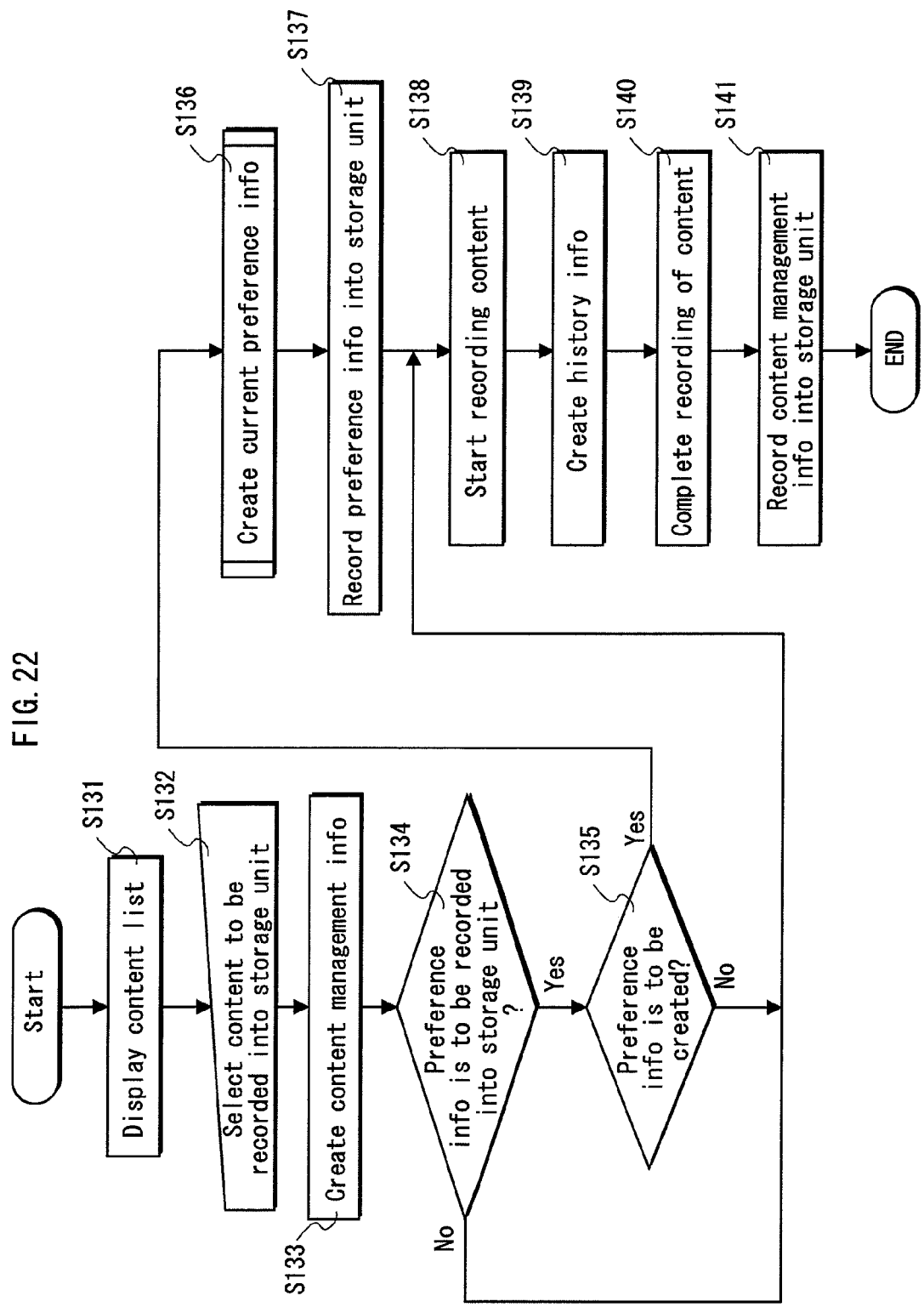
FIG. 22 is a flowchart showing the operation when a content transmitted from the content transmitting device 110 is recorded into the storage unit 144.

FIG. 22 is a flowchart showing the operation when a content transmitted from the content transmitting device 110 is recorded into the storage unit 144.

First, the control unit 142 causes the display device 150 to display a content list transmitted from the content list transmitting device 120 (S131).

Next, the control unit 142 receives, from the user via the input/output unit 145, selection of a content to be recorded into the storage unit 144 (S132). The control unit 142 then creates the content management information of the selected content, based on the content list (S133).

Next, the recording/playback processing unit 201 of the control unit 142 judges whether or not the preference information should be stored into the storage unit (S134). When it is judged that the preference information should be stored into the storage unit (S134: Yes), the control proceeds to step S135. For the judgment in step S134 to be made, for example, the display device 150 may be caused to display "Do you want to store preference information in the HDD?" to urge the user to input selection each time a content is recorded, or the initial settings of the terminal device 140 may include a setting on whether or not to store preference information along with each recording of a content.

In step S135, the recording/playback processing unit 201 judges whether or not the preference information should be created. In this judgment, for example, as in the flowchart shown in FIG. 8 (in particular, steps S16 through S20), it is judged that the preference information should be created when no preference information is stored in the storage unit 144 or when the preference information in the storage unit 144 is very old.

When the recording/playback processing unit 201 judges that the preference information should be created (S135: Yes), the preference information processing unit 203 creates the current preference information (S136), and stores it into the storage unit 144 (S137). The process of step S136 is similar to the process having been explained with reference to FIG. 9, and description thereof is omitted.

Following this, the recording/playback processing unit 201 starts recording the content selected in step S132 (S138). As the recording is started, the history information processing unit 202 creates the history information including "recording" as the type of operation (S139).

After the recording of the content is completed (S140), the recording/playback processing unit 201 records the content management information into the storage unit 144 (S141).

According to the second embodiment, it is possible to record a content into the terminal device 140 together with the preference information. With this structure, when the terminal device 140 plays back the stored content, the list of recommendation contents for the user can be created based on the user's preference at the time of recording the content into the terminal device 140, not based on the user's preference at the time of playback of the content.

Third Embodiment

In the first embodiment, the control unit 142 (the recommendation list processing unit 204) of the terminal device 140 creates the recommendation list based on the preference information. On the other hand, in the third embodiment, a device external to the terminal device creates the recommendation list.

With the structure in which an external device creates the recommendation list, the display of the recommendation list can be realized even in a terminal device with such a simple structure as not having the recommendation list creation function.

Figure 23:
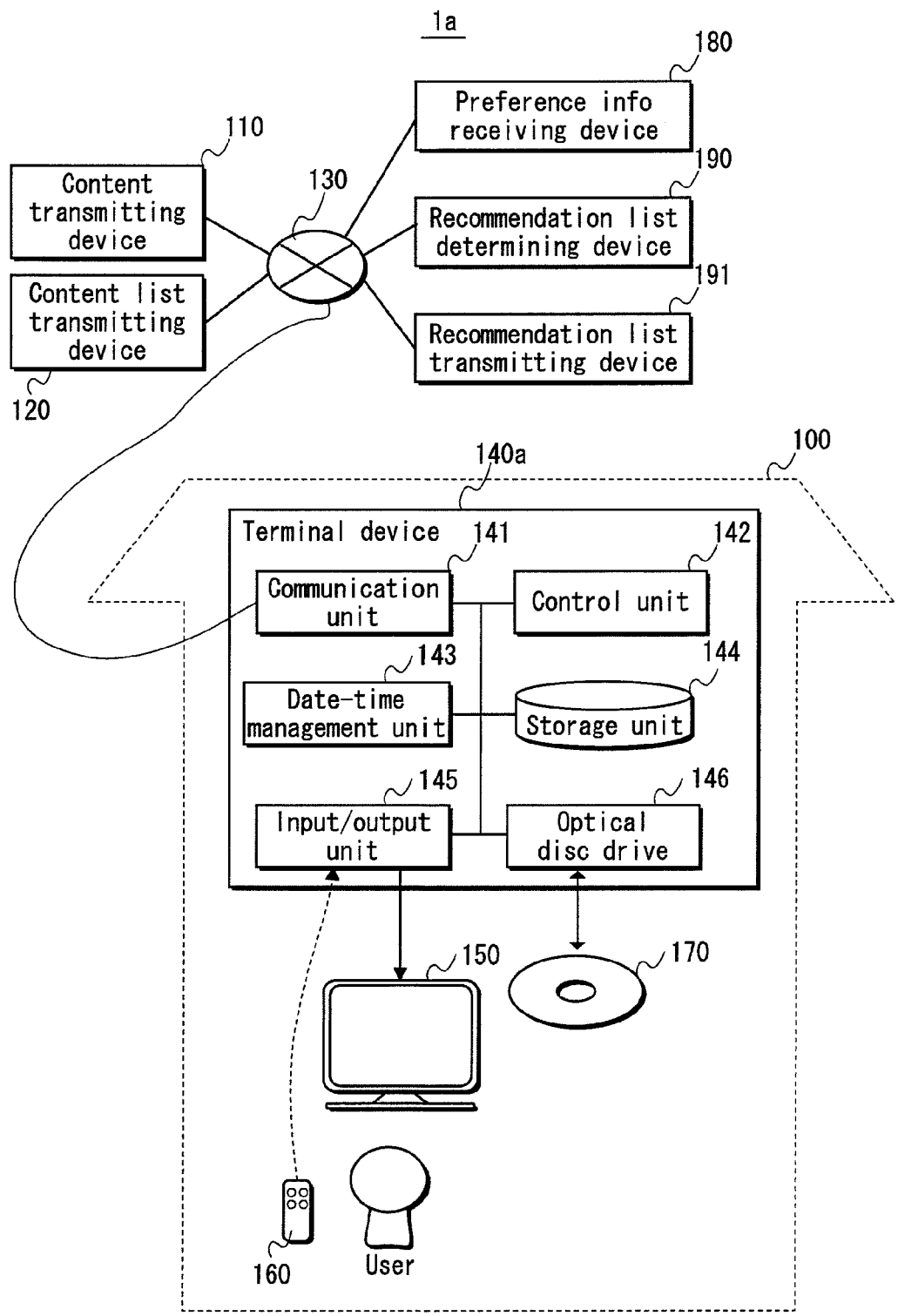
FIG. 23 illustrates a structure of the system.

As shown in FIG. 23, the system 1 includes a preference information receiving device 180, a recommendation list determining device 190, and a recommendation list transmitting device 191.

Also, a control unit 142a of a terminal device 140a, different from the control unit 142 of the terminal device 140 (see FIGS. 1, 2), does not include the recommendation list processing unit 204. Instead, the recommendation list determining device 190 performs the same function as the recommendation list processing unit 204.

Among the constitutional elements shown in FIG. 23, those having the same reference numbers as those in FIG. 1 are not described here since they are the same.

Figure 24:
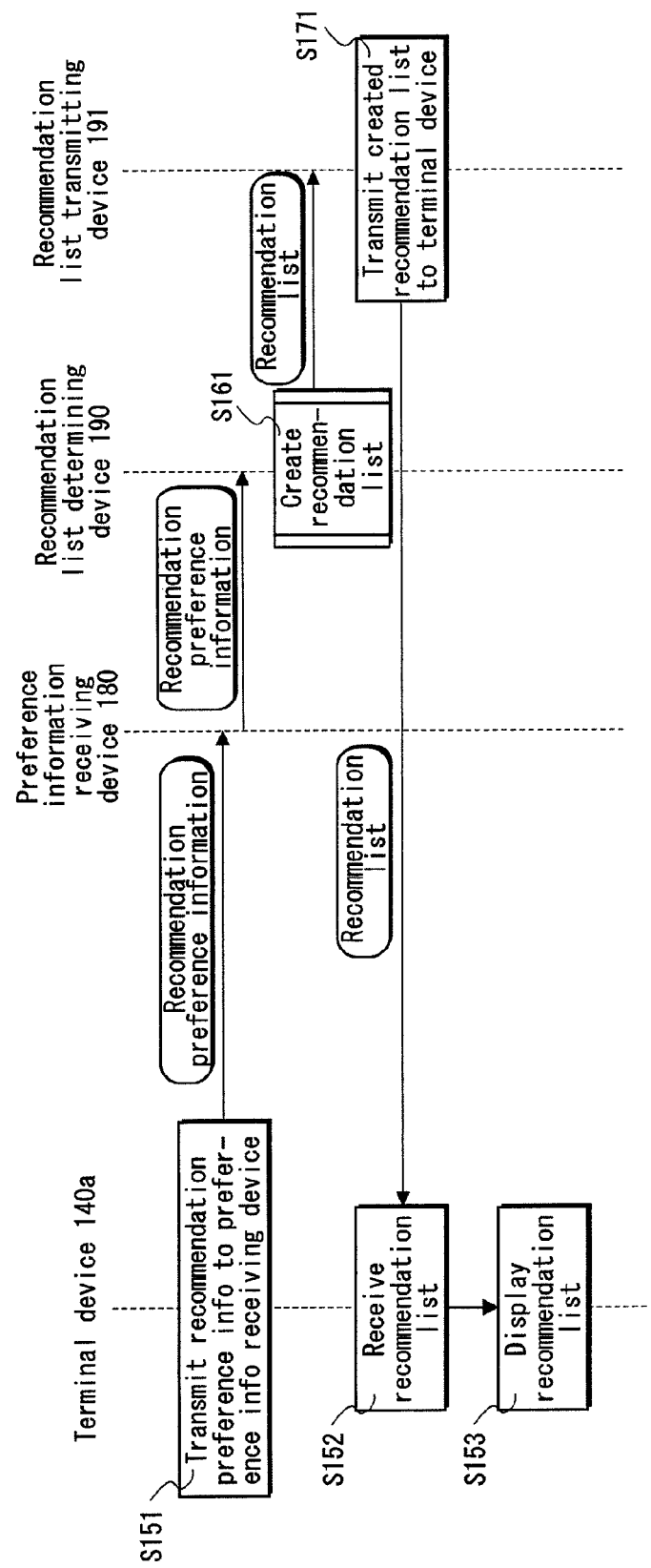
FIG. 24 is a flowchart showing the procedure in which the recommendation preference information is transmitted and the recommendation list is received and displayed.

FIG. 24 is a flowchart showing the procedure in which the terminal device 140*a* transmits the recommendation preference information, obtains the recommendation list, and displays it.

First, the control unit 142*a* of the terminal device 140*a* transmits the recommendation preference information to the preference information receiving device (S151).

Note that the recommendation preference information has been created based on the preference information written on the optical disc 170, as explained with reference to FIG. 11.

The recommendation list determining device 190 obtains the recommendation preference information from the preference information receiving device 180, and creates the recommendation list based on the obtained recommendation preference information (S161). The creation of the recommendation list is the same that having been explained with reference to FIG. 15.

Next, the recommendation list transmitting device 191 obtains the recommendation list from the recommendation list determining device 190, and transmit it to the terminal device 140*a* (S171).

Upon receiving the recommendation list (S152), the terminal device 140*a* displays the received recommendation list (S153).

Note that, in step S151, the terminal device 140*a* may newly create recommendation preference information that is different from the recommendation preference information transmitted in step S151 (see steps S97 through S101) and obtain a new recommendation list.

<Supplementary Notes 1>

Up to now, embodiments of the present invention have been described. However, the present invention is not limited to the above-described forms, but may be implemented in various forms for realizing the objectives of the present invention and other objectives related thereto. The following are examples of such.

(1) In the first embodiment, if the optical disc 170 stores preference information having been created within past three days, new preference information is not created and the existing preference information is used (FIG. 8, S18: Yes, S20). However, the period is not limited to three days, but may be an arbitrary period such as 30 days. However, when the preference information is too old, the information may not properly reflect the preference of the user at the time of the writing. Thus it is preferable that the period is short enough not to cause the preference of the user to change.

(2) In the first embodiment, the preference information is created based on pieces of history information whose operation date-time is within the past 60 days from the date-time at which the preference information is created, among all the history information (S33, S38). However, the period is not limited to 60 days, but may be an arbitrary period such as 30 days. However, when the period is too short, as many pieces of preference information as sufficient enough to reflect the preference of the user may not be obtained. Also, when the period is too long (for example, 1000 days), the preference of the user at the time of the creation may not be reflected.

Also, the present invention is not limited to this method, but may be any method as far as it can reflect the preference of the user at the time of the creation. For example, a function for reducing an evaluation value as time elapses from an operation date-time may be applied. Such a function is recited in Reference Document 1 (Japanese Patent No. 4270037), and description thereof is omitted here.

(3) In the first embodiment, three types of operations (recording, playback, and writing) are provided as examples of the types of operations regarding contents. However, the operations regarding contents are not limited to the three types of operations. For example, the operations regarding contents may include: "real-time playback" for playing back a content transmitted from the content transmitting device 110 as it is; and "browsing" for browsing, for example, an explanation of a content transmitted from the content transmitting device 110.

(4) In the first embodiment, the optical disc 170 composed of a Blu-ray Disc (BD) or the like is provided as an example of the external recording medium being external to the terminal device 140. However, not limited to this, the external recording medium may be another optical disc such as DVD, CD-ROM, or MO.

Furthermore, the external recording medium is not limited to an optical disc, but may be USB (Universal Serial Bus) memory or a memory card such as an SD memory card. When a memory card is used, the terminal device 140 needs to be equipped with a memory card slot, instead of the optical disc drive 146, for holding and removing the memory card.

(5) Although not specifically mentioned in the embodiments, the present invention is also applicable to a User-Generated Content (UGC) that was shot by the user him/herself using a digital movie or the like. When the UGC is used, the items such as "title", "genre", and "explanation" included in the content management information may be created based on the manual operation of the user.

Also, the contents are not limited to videos, but may be photographs.

Here, an example of the use of photographs will be explained. In the state where photographs taken by the digital camera are stored in the storage unit 144 of the terminal device 140, when one of the photographs is written onto the optical disc, the preference information is written as well.

Furthermore, when the user is to browse photographs recorded on the optical disc, a recommendation is displayed based on the preference information recorded on the optical disc.

(6) In the first embodiment, the recommendation list processing unit 204 creates the recommendation list. Here, what is created and presented by the recommendation list processing unit 204 is not limited to the list format, but may be, for example, an alignment of thumbnails of the respective contents, or may be a screen in which a plurality of contents are played back in line with each other. In short, the "recommendation list" only needs to be information that indicates recommendations for the user and the way it is presented to the user is not limited to the list format.

(7) In the first embodiment, the terminal device 140 creates the recommendation list based on the preference information. However, the creation of the preference information may be delegated to an external device. For example, the terminal device 140 may transmit the preference information to an external server (a server having the function to create the recommendation list from the preference information), and receive the recommendation list, created in correspondence with the preference information, from the external server.

(8) In the first embodiment, a message "Following are recommendations based on . . . " (FIG. 20), explaining the origin of the recommendation list, is displayed. However, not limited to such a text message, icons or illustrations may be displayed instead.

(9) In the first embodiment, various notifications to the user take forms that appeal to the eye of the user. However, the presentation of such notifications is not limited to the display, but may be realized by any method that appeals to any of the five senses of the user, for example, by a voice/sound that can be heard by the user.

(10) In the first embodiment, a content to be written onto the optical disc 170 is selected (S13), and then it is judged whether or not the optical disc 170 has been inserted in the optical disc drive 146 (S14). However, performance of the step for confirming the insertion of the optical disc 170 is not limited to this order, but, for example, step S14 may be performed before step S11

(11) The operation/process of the terminal device described in each embodiment may be recorded on a recording medium in the form of a control program composed of program codes for causing each circuit to execute the operation/process, or may be circulated or distributed via any of various communication paths.

Such recording mediums include non-transitory recording mediums such as IC card, hard disk, optical disc, and flexible disc.

The circulated or distributed control program is stored for use into a memory or the like to be read by the processor, and the processor executes the control program to realize the various functions described in the embodiments.

(12) Each functional block of the terminal device in each embodiment is typically realized as an LSI, an integrated circuit. Each of the functional blocks may be realized separately in one chip. Also, part or all of functional blocks may be realized in one chip.

Although the term LSI is used here, it may be called IC, LSI, system LSI, super LSI, ultra LSI or the like, depending on the level of integration. Also, the integration method is not limited to the LSI, but may be realized by a dedicated circuit or a general-purpose processor. It is also possible to use the FPGA (Field Programmable Gate Array) with which a programming is available after the LSI is manufactured, or the reconfigurable processor that can re-configure the connection or setting of the circuit cells within the LSI. Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

Figure 25B:
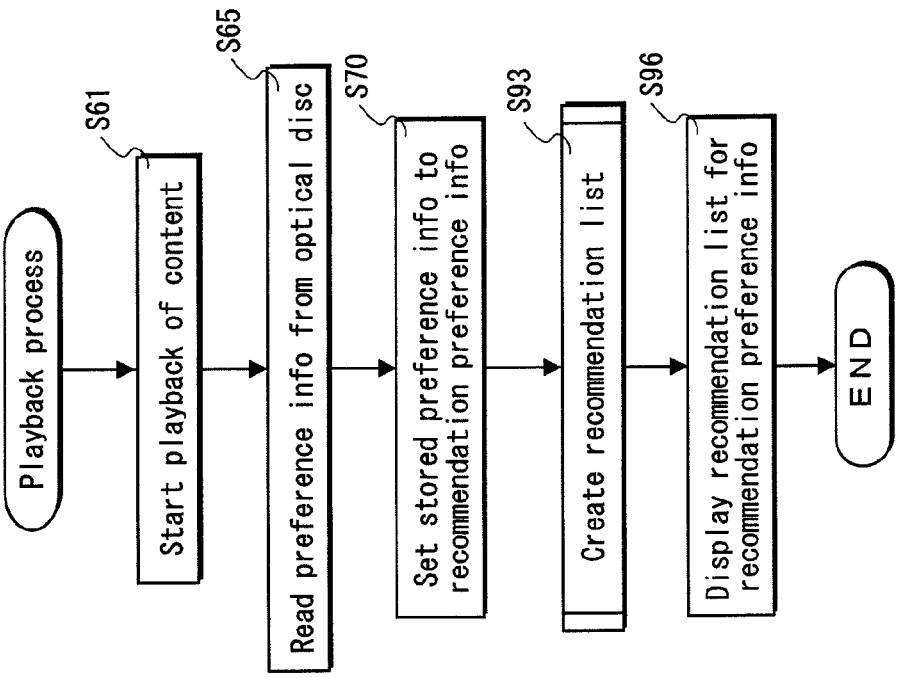
FIGS. 25A and 25B show details of the writing process and the playback process.
Figure 25A:
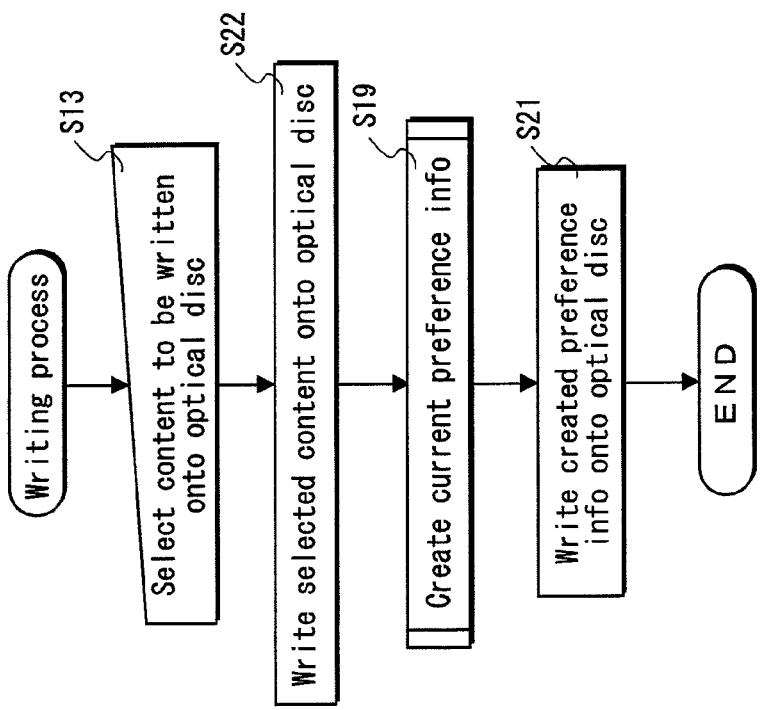

(13) The objectives of the above-described embodiments are summarized as: (A) to store the preference information in the optical disc 170; and (B) to create the recommendation list based on the preference information stored in the optical disc 170 and display the created recommendation list. For this reason, instead of the complicated flowcharts described in the first embodiment, the simple flowcharts as shown in FIGS. 25A and 25B may be executed by the structural elements. Each step constituting the flowcharts shown in FIGS. 25A and 25B is the same as each corresponding step shown in the figures including FIGS. 8-12 and 14 having the same step number, and description thereof is omitted here.

(14) In each embodiment, the history information is explained with reference to FIG. 6 or the like. However, the history information only needs to include at minimum: (A) the operation date-time at which the operation of the content was received; and (B) information regarding the content. The information regarding the content includes information such as an ID for identifying the content, and information on the content (such as the title, genre, and explanation of the content).

In the embodiments, the recommendation list is created from the preference information by extracting keywords from the information attached to the content. However, not limited to this, for example, keywords may be generated from the audio of the content by using the voice (sound) recognition technology, or keywords, may be generated from the subtitle that appears during playback of the content.

<Supplementary Notes 2>

The embodiments of the present invention include the following modes.

(1) A terminal device comprising: a content storage unit storing one or more contents; an operation receiving unit operable to receive operation regarding viewing of contents from a user; a storage unit collecting history information indicating history of operations in correspondence with each of the contents stored in the content storage unit; a recording medium loading unit in which an external recording medium is loaded in a loadable/unloadable state; a writing receiving unit operable to receive a writing instruction for writing a content stored in the content storage unit to the external recording medium; a generating unit operable to, upon reception of the writing instruction, generate preference information of the user in accordance with a piece of history information corresponding to the content specified in the writing instruction; and a writing unit operable to write the specified content and the corresponding preference information onto the external recording medium.

(2) The terminal device according to (1) further comprising: an information storage unit storing information regarding each of a plurality of contents; a reading unit operable to read the preference information from the external recording medium loaded in the recording medium loading unit; a creating unit operable to create first information indicating contents being recommendations for the user, by checking the preference information against the information stored in the information storage unit; and a display control unit operable to control a display in accordance with the first information.

With the above-described structure, it is possible to create a list of contents recommended for the user, based on the preference information written on an external recording medium. The preference information written on an external recording medium reflects the preference of the user at the time of the writing in the past, not the preference of the user at the time when the preference information was read. Therefore, since contents are recommended for the user based on the preference information created in the past, contents in which the user is interested potentially can be recommended.

(3) The terminal device according to (2), wherein the display controlled by the display control unit includes a message indicating that the display is related to preference information generated when the content was recorded onto the external recording medium.

With the above-described structure, the display of the message makes it possible to notify the user of, for example, the fact that the contents displayed as recommendations for the user reflect the preference of the user at the time of writing in the past. This contributes to the improvement in usability of the terminal device.

(4) The terminal device according to (2), wherein when the preference information has not been written on the external recording medium loaded in the recording medium loading unit, the generating unit generate the preference information in accordance with the history information stored in the storage unit, and the creating unit creates second information indicating contents being recommendations for the user, by checking the generated preference information against the information stored in the information storage unit; and the display control unit controls a display in accordance with the second information.

With the above-described structure, even when no preference information has been written on the external recording medium, it is possible to display contents as recommendations by selecting them from preference information based on the history information, instead of from the preference information written on the external recording medium. This contributes to avoiding of the state in which there is no contents to be recommended for the user.

(5) The terminal device according to (2), wherein the generating unit generates preference information in accordance with the history information stored in the storage unit, the creating unit creates second information indicating contents being recommendations for the user, by checking the generated preference information against the information stored in the information storage unit, and the display control unit provides, in accordance with the first information, a display including a message indicating that the display is related to preference information generated when the content was recorded onto the external recording medium, and provides, in accordance with the second information, a display including a message indicating that the display is related to preference information generated when the display was provided.

With the above-described structure, the display of the message makes it possible to notify the user, for example, that the contents displayed as recommendations for the user reflect the preference of the user at the time of writing in the past, or reflect the preference of the user at the time of displaying thereof. This contributes to the improvement in usability of the terminal device.

(6) The terminal device according to (2), wherein the content is a television program received from a television broadcast station, or is a content distributed from a content server.

(7) The terminal device according to (6), wherein the information regarding each of the plurality of contents stored in the information storage unit is a broadcast program listing indicating television programs to be broadcast by the television broadcast station, or is a content listing indicating contents to be distributed by the content server.

(8) The terminal device according to (1), wherein the history information includes explanation of each content regarding which operation was received, and the generating unit generates the preference information by extracting keywords from the explanation for each of the plurality of contents, and calculating evaluation values of the respective keywords.

(9) The terminal device according to (8) further comprising: an explanation storage unit storing information indicating explanation of each of the plurality of contents, wherein the history information stored in the storage unit includes explanation of each content regarding which operation was received, the generating unit generates, in accordance with the history information stored in the storage unit, current preference information including keywords and evaluation values of the respective keywords, the keywords being extracted from the explanation for each of the plurality of contents, the terminal device further comprising: a reading unit operable to read the preference information from the external recording medium loaded in the recording medium loading unit, wherein the generating unit generates difference preference information including evaluation values that are results of subtracting evaluation values of keywords in the current preference information from respective evaluation values of keywords, which are identical with the keywords in the current preference information, in the read preference information, and the terminal device further comprises: a recommendation creating unit operable to create information indicating contents being recommendations for the user, by checking the keywords and the evaluation values included in the difference preference information against keywords extracted from the explanation of the contents; and a display control unit operable to control a display in accordance with the information created by the recommendation creating unit.

With the above-described structure, it is possible to highlight the keywords whose evaluation values are high in the written preference information and low in the current preference information. This, for example, can cause the user to find the change in his/her preference.

(10) The terminal device according to (1), wherein the preference information generated by the generating unit includes a generation date-time indicating a date-time at which the preference information was generated, the terminal device further comprises: a reading unit operable to, upon reception of the writing instruction by the writing receiving unit, read the preference information from the external recording medium loaded in the recording medium loading unit; and a generation control unit operable to prohibit the generating unit from generating the preference information when the generation date-time of the read preference information is within a predetermined time period extending back from a time when the preference information was read.

With the above-described structure, the prohibition of generation of the preference information reduces the processing load required for the generation of the preference information.

(11) The terminal device according to (1), wherein the preference information stored in the storage unit includes operation date-times indicating date-times at which processes for respective contents regarding which operations were received were performed, and the generating unit generates the preference information in accordance with a piece of history information, among the history information stored in the storage unit, that includes an operation date-time which is within a predetermined time period extending back from a time when the preference information is generated, and does not generate the preference information in accordance with any piece of history information that includes an operation date-time which is not within the predetermined time period.

With the above-described structure, the history information for use in generation of the preference information is narrowed down to the history information that includes an operation date-time which is within a predetermined time period extending back from a time when the preference information is generated. This contributes the generation of the preference information that reflects the preference of the user at the time of the generation, excluding older history information that is supposed to hardly reflect the preference of the user at the time of the generation.

(12) The terminal device according to (1), wherein the operation regarding viewing of a content received by the operation receiving unit includes at least one of playback of the content, recording of the content, and writing of the content onto the external recording medium.

(13) The terminal device according to (1) further being capable of communicating with an external device which creates, in accordance with preference information, first information indicating contents being recommendations for the user, the terminal device further comprising: a reading unit operable to read the preference information from the external recording medium loaded in the recording medium loading unit; a transmitting unit operable to transmit the read preference information to the external device; a receiving unit operable to receive, from the external device, a piece of first information that corresponds to the preference information transmitted to the external device; and a display control unit operable to control a display in accordance with the received piece of first information.

(14) A method for controlling a terminal device, the method comprising the steps of: storing one or more contents; receiving operation regarding viewing of contents from a user; collecting history information indicating history of operations in correspondence with each of the stored contents; loading an external recording medium in a loadable/unloadable state; receiving a writing instruction for writing a stored content to the external recording medium; generating, upon reception of the writing instruction, preference information of the user in accordance with a piece of history information corresponding to the content specified in the writing instruction; and writing the specified content and the corresponding preference information onto the external recording medium.

(15) A non-transitory recording medium on which a computer-readable program is recorded, the program comprising the steps of: storing one or more contents; receiving operation regarding viewing of contents from a user; collecting history information indicating history of operations in correspondence with each of the stored contents; loading an external recording medium in a loadable/unloadable state; receiving a writing instruction for writing a stored content to the external recording medium; generating, upon reception of the writing instruction, preference information of the user in accordance with a piece of history information corresponding to the content specified in the writing instruction; and writing the specified content and the corresponding preference information onto the external recording medium.

(16) A terminal device comprising: a content storage unit storing one or more contents; an operation receiving unit operable to receive operation regarding viewing of contents from a user; a storage unit collecting history information indicating history of operations in correspondence with each of the contents stored in the content storage unit; a memory unit; a recording receiving unit operable to receive a recording instruction for recording the content onto the memory unit; a generating unit operable to, upon reception of the recording instruction, generate preference information of the user in accordance with a piece of history information corresponding to the content specified in the recording instruction; and a recording unit operable to record the specified content and the corresponding preference information onto the memory unit.

(17) A playback device for playing back a content recorded on an external recording medium, the playback device comprising: a storage unit storing information regarding each of a plurality of contents; a reading unit operable to read preference information from the external recording medium; a creating unit operable to create first information indicating contents being recommendations for a user, by checking the preference information against the information stored in the storage unit; and a display control unit operable to control a display in accordance with the first information.

REFERENCE DOCUMENT

The following is a document incorporated herein by reference for the enablement requirement.
Reference Document 1: Japanese Patent No. 4270037

INDUSTRIAL APPLICABILITY

The present invention provides a terminal device and a method for controlling the terminal device that can recommend the user not only contents based on the current preference of the user, but contents based on the preference of the user in a certain period in the past, the contents being interested by the user potentially.

REFERENCE SIGNS LIST 1, 1a system
110 content transmitting device
120 content list transmitting device
140 terminal device
142, 142a control unit
144 storage unit
146 optical disc drive
150 display device
160 input device
170 optical disc (example of an external recording medium)
180 preference information receiving device
190 recommendation list determining device
191 recommendation list transmitting device
201 recording/playback processing unit
202 history information processing unit
203 preference information processing unit
204 recommendation list processing unit
205 optical disc drive control unit
301 content storage area
302 content management information storage area
303 history information storage area
304 preference information storage area
312 content management information
313 history information
314 preference information
333 predetermined number of pieces of history information
401 content storage area
402 content management information storage area
404 preference information storage area
412 content management information

The invention claimed is:
1. A terminal device comprising:
a content storage unit storing one or more contents;
an operation receiving unit operable to receive operation regarding viewing of contents from a user;
a storage unit collecting history information indicating history of operations in correspondence with each of the contents stored in the content storage unit;
a recording medium loading unit in which an external recording medium is loaded in a loadable/unloadable state;
a writing receiving unit operable to receive a writing instruction for writing a content stored in the content storage unit to the external recording medium;
a generating unit operable to, upon reception of the writing instruction, generate preference information of the user in accordance with a piece of history information corresponding to the content specified in the writing instruction;
a writing unit operable to write the specified content and the corresponding preference information onto the external recording medium;

an information storage unit storing information regarding each of a plurality of contents;
a reading unit operable to read the preference information from the external recording medium loaded in the recording medium loading unit;
a creating unit operable to create first information indicating contents being recommendations for the user, by checking the preference information against the information stored in the information storage unit; and
a display control unit operable to control a display in accordance with the first information,
wherein the display controlled by the display control unit includes a message indicating that the display is related to preference information generated when the content was recorded onto the external recording medium.

2. A terminal device comprising:
a content storage unit storing one or more contents;
an operation receiving unit operable to receive operation regarding viewing of contents from a user;
a storage unit collecting history information indicating history of operations in correspondence with each of the contents stored in the content storage unit;
a recording medium loading unit in which an external recording medium is loaded in a loadable/unloadable state;
a writing receiving unit operable to receive a writing instruction for writing a content stored in the content storage unit to the external recording medium;
a generating unit operable to, upon reception of the writing instruction, generate preference information of the user in accordance with a piece of history information corresponding to the content specified in the writing instruction;
a writing unit operable to write the specified content and the corresponding preference information onto the external recording medium;
an information storage unit storing information regarding each of a plurality of contents;
a reading unit operable to read the preference information from the external recording medium loaded in the recording medium loading unit;
a creating unit operable to create information indicating contents being recommendations for the user, by checking the preference information against the information stored in the information storage unit; and
a display control unit operable to control a display in accordance with the first information,
wherein the generating unit generates preference information in accordance with the history information stored in the storage unit,
the creating unit creates second information indicating contents being recommendations for the user, by checking the generated preference information against the information stored in the information storage unit, and
the display control unit provides, in accordance with the first information, a display including a message indicating that the display is related to preference information generated when the content was recorded onto the external recording medium, and provides, in accordance with the second information, a display including a message indicating that the display is related to preference information generated when the display was provided.

3. The terminal device according to claim 2,
wherein the content is a television program received from a television broadcast station, or is a content distributed from a content server.

4. The terminal device according to claim 3,
wherein the information regarding each of the plurality of contents stored in the information storage unit is a broadcast program listing indicating television programs to be broadcast by the television broadcast station, or is a content listing indicating contents to be distributed by the content server.

5. The terminal device according to claim 2,
wherein the preference information generated by the generating unit includes a generation date-time indicating a date-time at which the preference information was generated,
the terminal device further comprises:
a reading unit operable to, upon reception of the writing instruction by the writing receiving unit, read the preference information from the external recording medium loaded in the recording medium loading unit; and
a generation control unit operable to prohibit the generating unit from generating the preference information when the generation date-time of the read preference information is within a predetermined time period extending back from a time when the preference information was read.

6. The terminal device according to claim 2,
wherein the preference information stored in the storage unit includes operation date-times indicating date-times at which processes for respective contents regarding which operations were received were performed, and
the generating unit generates the preference information in accordance with a piece of history information, among the history information stored in the storage unit, that includes an operation date-time which is within a predetermined time period extending back from a time when the preference information is generated, and does not generate the preference information in accordance with any piece of history information that includes an operation date-time which is not within the predetermined time period.

7. The terminal device according to claim 2,
wherein the operation regarding viewing of a content received by the operation receiving unit includes at least one of playback of the content, recording of the content, and writing of the content onto the external recording medium.

8. A terminal device comprising:
a content storage unit storing one or more contents;
an operation receiving unit operable to receive operation regarding viewing of contents from a user;
a storage unit collecting history information indicating history of operations in correspondence with each of the contents stored in the content storage unit;
a recording medium loading unit in which an external recording medium is loaded in a loadable/unloadable state;
a writing receiving unit operable to receive a writing instruction for writing a content stored in the content storage unit to the external recording medium;
a generating unit operable to, upon reception of the writing instruction, generate preference information of the user in accordance with a piece of history information corresponding to the content specified in the writing instruction; and
a writing unit operable to write the specified content and the corresponding preference information onto the external recording medium,
wherein the history information includes explanation of each content regarding which operation was received, and the generating unit generates the preference information by extracting keywords from the explanation for each of the plurality of contents, and calculating evaluation values of the respective keywords.

9. The terminal device according to claim 8, wherein the history information stored in the storage unit includes explanation of each content regarding which operation was received, the generating unit generates, in accordance with the history information stored in the storage unit, current preference information including keywords and evaluation values of the respective keywords, the keywords being extracted from the explanation for each of the plurality of contents, the terminal device further comprising:

a reading unit operable to read the preference information from the external recording medium loaded in the recording medium loading unit, wherein the generating unit generates, by calculating a subtraction, difference preference information including differences between evaluation values of keywords in the current preference information and respective evaluation values of keywords, which are identical with the keywords in the current preference information, in the preference information read from the external recording medium, and the terminal device further comprises:

a recommendation creating unit operable to create information indicating contents being recommendations for the user, by checking the keywords and the evaluation values included in the difference preference information against keywords extracted from the explanation of the contents; and a display control unit operable to control a display in accordance with the information created by the recommendation creating unit.

10. A method for controlling a terminal device, the method comprising the steps of:

storing one or more contents;
receiving operation regarding viewing of contents from a user;
collecting history information indicating history of operations in correspondence with each of the stored contents;
loading an external recording medium in a loadable/unloadable state;
receiving a writing instruction for writing a stored content to the external recording medium;
generating, upon reception of the writing instruction, preference information of the user in accordance with a piece of history information corresponding to the content specified in the writing instruction;
writing the specified content and the corresponding preference information onto the external recording medium;
storing information regarding each of a plurality of contents;
reading the preference information from the loaded external recording medium;
creating first information indicating contents being recommendations for the user, by checking the preference information against the second information; and
controlling a display in accordance with the first information,
wherein the generating step generates preference information in accordance with the stored history information,
the creating step creates second information indicating contents being recommendations for the user, by checking the generated preference information against the stored information, and
the controlling step provides, in accordance with the first information, a display including a message indicating that the display is related to preference information generated when the content was recorded onto the external recording medium, and provides, in accordance with the second information, a display including a message indicating that the display is related to preference information generated when the display was provided.

11. A non-transitory recording medium on which a computer-readable program is recorded, the program comprising the steps of:

storing one or more contents;
receiving operation regarding viewing of contents from a user;
collecting history information indicating history of operations in correspondence with each of the stored contents;
loading an external recording medium in a loadable/unloadable state;
receiving a writing instruction for writing a stored content to the external recording medium;
generating, upon reception of the writing instruction, preference information of the user in accordance with a piece of history information corresponding to the content specified in the writing instruction;
writing the specified content and the corresponding preference information onto the external recording medium;
storing information regarding each of a plurality of contents;
reading the preference information from the loaded external recording medium;
creating first information indicating contents being recommendations for the user, by checking the preference information against the second information; and
controlling a display in accordance with the first information,
wherein the generating step generates preference information in accordance with the stored history information,
the creating step creates second information indicating contents being recommendations for the user, by checking the generated preference information against the stored information, and
the controlling step provides, in accordance with the first information, a display including a message indicating that the display is related to preference information generated when the content was recorded onto the external recording medium, and provides, in accordance with the second information, a display including a message indicating that the display is related to preference information generated when the display was provided.

12. A playback device for playing back a content recorded on an external recording medium, the playback device comprising:

a content storage unit storing one or more contents;
a storage unit collecting history information indicating history of operations in correspondence with each of the contents stored in the content storage unit;
a generating unit operable to generate preference information of a user based on the history information;
a storage unit storing information regarding each of a plurality of contents;
a reading unit operable to read preference information from the external recording medium;

a creating unit operable to create first information indicating contents being recommendations for a user, by checking the preference information against the information stored in the storage unit; and a display control unit operable to control a display in accordance with the first information, wherein the generating unit generates preference information in accordance with the history information stored in the storage unit, the creating unit creates second information indicating contents being recommendations for the user, by checking the generated preference information against the information stored in the information storage unit, and the display control unit provides, in accordance with the first information, a display including a message indicating that the display is related to preference information generated when the content was recorded onto the external recording medium, and provides, in accordance with the second information, a display including a message indicating that the display is related to preference information generated when the display was provided.

13. An integrated circuit in which are integrated circuits that function as:

a content storage unit storing one or more contents;

an operation receiving unit operable to receive operation regarding viewing of contents from a user;

a storage unit collecting history information indicating history of operations in correspondence with each of the contents stored in the content storage unit;

a recording medium loading unit in which an external recording medium is loaded in a loadable/unloadable state;

a writing receiving unit operable to receive a writing instruction for writing a content stored in the content storage unit to the external recording medium;

a generating unit operable to, upon reception of the writing instruction, generate preference information of the user in accordance with a piece of history information corresponding to the content specified in the writing instruction;

a writing unit operable to write the specified content and the corresponding preference information onto the external recording medium;

an information storage unit storing information regarding each of a plurality of contents;

a reading unit operable to read the preference information from the external recording medium loaded in the recording medium loading unit;

a creating unit operable to create first information indicating contents being recommendations for the user, by checking the preference information against the information stored in the information storage unit; and a display control unit operable to control a display in accordance with the first information, wherein the generating unit generates preference information in accordance with the history information stored in the storage unit, the creating unit creates second information indicating contents being recommendations for the user, by checking the generated preference information against the information stored in the information storage unit, and the display control unit provides, in accordance with the first information, a display including a message indicating that the display is related to preference information generated when the content was recorded onto the external recording medium, and provides, in accordance with the second information, a display including a message indicating that the display is related to preference information generated when the display was provided.

* * * * *